United States Patent
Joe et al.

(10) Patent No.: US 7,845,218 B2
(45) Date of Patent: Dec. 7, 2010

(54) TIRE STATE ESTIMATOR AND TIRE STATE ESTIMATION METHOD

(75) Inventors: Shinichiro Joe, Yokohama (JP);
Yoshitaka Deguchi, Yokohama (JP);
Yung-Hsiang Judy Hsu, Stanford, CA (US); Shad Mitchell Laws, Palo Alto, CA (US); Joseph Christian Gerdes, Los Altos, CA (US)

(73) Assignees: Nissan Motor Co., Ltd., Yokohama-shi (JP); The Board of Trustees of the Leland Stanford Junior University, Palo Alto, CA (US)

( * ) Notice: Subject to any disclaimer, the term of this patent is extended or adjusted under 35 U.S.C. 154(b) by 65 days.

(21) Appl. No.: 12/242,292

(22) Filed: Sep. 30, 2008

(65) Prior Publication Data
US 2010/0077847 A1    Apr. 1, 2010

(51) Int. Cl.
*B60C 23/02* (2006.01)
(52) U.S. Cl. .................................. 73/146.5
(58) Field of Classification Search ........ None
See application file for complete search history.

(56) References Cited

U.S. PATENT DOCUMENTS

| | | | | |
|---|---|---|---|---|
| 5,742,917 A | * | 4/1998 | Matsuno ............... | 701/69 |
| 5,747,682 A | * | 5/1998 | Hirano ............... | 73/115.07 |
| 5,762,157 A | * | 6/1998 | Uehara ............... | 180/197 |
| 2005/0222728 A1 | * | 10/2005 | Hac et al. ............... | 701/38 |
| 2008/0109133 A1 | * | 5/2008 | Bedner et al. ............... | 701/41 |

FOREIGN PATENT DOCUMENTS

JP    2005-008062 A    1/2005

OTHER PUBLICATIONS

Masato Abe, "Jidosha No Undo to Seigyo", Vehicle Dynamics and Control, 1992 Sankaido, ISBN 4-381-10052-2, pp. 30-39.

* cited by examiner

*Primary Examiner*—Andre J Allen
(74) *Attorney, Agent, or Firm*—Foley & Lardner LLP

(57) ABSTRACT

A tire state estimator includes a lateral force upper limit estimating section, a lateral force estimating section, and a tire slip angle estimating section. The lateral force upper limit estimating section calculates an estimated tire lateral force upper limit, on a basis of an estimated tire slip angle and a measured tire self aligning torque. The lateral force estimating section calculates an estimated tire lateral force, on a basis of the estimated tire lateral force upper limit calculated by the lateral force upper limit estimating section and the estimated tire slip angle. The tire slip angle estimating section calculates the estimated tire slip angle, on a basis of the estimated tire lateral force calculated by the lateral force estimating section and a measured vehicle state.

20 Claims, 18 Drawing Sheets

TIRE STATE ESTIMATOR AND TIRE STATE ESTIMATION METHOD

BACKGROUND OF THE INVENTION

The present invention relates generally to automotive vehicles, and particularly to tire state estimators and tire state estimation methods for estimating a state of a tire set of an automotive vehicle.

Japanese Patent Application Publication No. 2005-8062 (JP2005-8062) discloses a tire grip degree estimator for estimating a degree of grip of a tire set of an automotive vehicle in a lateral direction of the tire set. The estimation is implemented by calculating an estimated tire grip degree on a basis of a ratio of an estimated tire self aligning torque to a modeled tire self aligning torque.

Self aligning torque (SAT) is a torque that is applied from a road surface to a steerable tire about the axis of steering.

SUMMARY OF THE INVENTION

In general, when a tire is steered, the lateral force and self aligning torque of the tire change with delay due to elastic deformation of the tire. Accordingly, the actual grip degree of the tire changes with delay with respect to the steer angle of the tire. Situations are possible in which when the steer angle of the tire has increased and reached a value that is, in steady state, corresponding to an upper limit of grip, the actual grip degree has not yet reached the upper limit. If the tire grip degree estimator of JP2005-8062 is employed to create a control system for preventing a tire set from shifting from grip state to slip state, the control system may permit a situation in which the steer angle and slip angle of the tire overshoot values that are, in steady state, corresponding to the upper limit, in consideration that an estimated tire grip degree is still below the upper limit. This may make the dynamic behavior of the vehicle unstable. Moreover, in response to delayed detection of the overshoot, the steering wheel angle may be reduced excessively due to the delay of response of grip degree to steering wheel angle. This may cause a phenomena of hunching between grip state and slip state, and thereby make a driver uncomfortable.

In view of the foregoing, it is desirable to provide a tire state estimator and a tire state estimation method for accurately estimating a state of a tire set of an automotive vehicle, and serving to prevent such undesirable situations as described above.

According to one aspect of the present invention, a tire state estimator comprises: a tire slip angle estimator configured to calculate an estimated tire slip angle, on a basis of an estimated tire lateral force upper limit and a measured vehicle state; and a lateral force upper limit estimator configured to calculate the estimated tire lateral force upper limit, on a basis of the estimated tire slip angle calculated by the tire slip angle estimator and a measured tire self aligning torque.

According to another aspect of the present invention, a tire state estimator comprises: a sensor arranged to collect information needed to measure a vehicle state, and a tire self aligning torque; and a controller connected for signal communication therewith to the sensor, and configured to: calculate an estimated tire slip angle, on a basis of an estimated tire lateral force upper limit and the measured vehicle state; and calculate the estimated tire lateral force upper limit, on a basis of the estimated tire slip angle and the measured tire self aligning torque.

According to a further aspect of the present invention, a tire state estimator comprises: tire slip angle estimating means for calculating an estimated tire slip angle, on a basis of an estimated tire lateral force upper limit and a measured vehicle state; and lateral force upper limit estimating means for calculating the estimated tire lateral force upper limit, on a basis of the estimated tire slip angle calculated by the tire slip angle estimating means and a measured tire self aligning torque.

According to a still further aspect of the present invention, a tire state estimation method comprises: a first operation of calculating an estimated tire slip angle, on a basis of an estimated tire lateral force upper limit and a measured vehicle state; and a second operation of calculating the estimated tire lateral force upper limit, on a basis of the estimated tire slip angle calculated by the first operation and a measured tire self aligning torque.

DETAILED DESCRIPTION OF THE INVENTION

Tire state estimators according to first to eighth embodiments of the present invention implement accurate estimation of a tire slip angle, a tire lateral force upper limit (or maximum possible tire lateral force) and a tire lateral force of a vehicle, and thereby allow keeping track of a margin to the tire lateral force upper limit, preventing a tire steer angle or tire slip angle from overshooting an upper limit corresponding to the tire lateral force upper limit, preventing the vehicle from falling in a state of drift or spin, avoiding a phenomena of hunching between grip state and slip state, and thereby preventing a driver from feeling uncomfortable, as described in detail below.

Figure 1A:
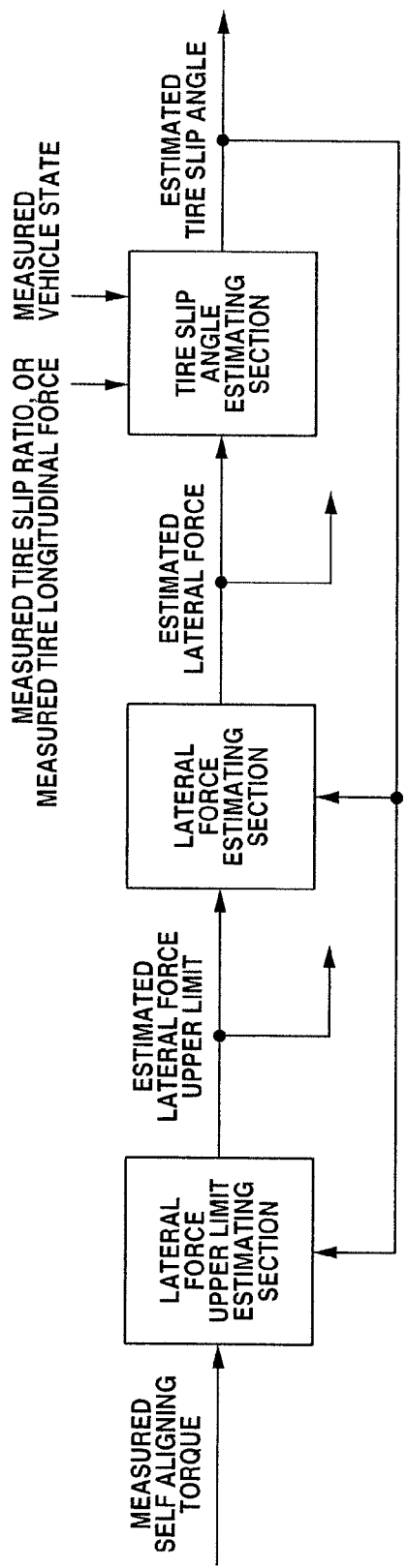
FIGS. 1A and 1B are block diagrams showing basic systems for tire state estimation according to first to eighth embodiments of the present invention.
Figure 1B:
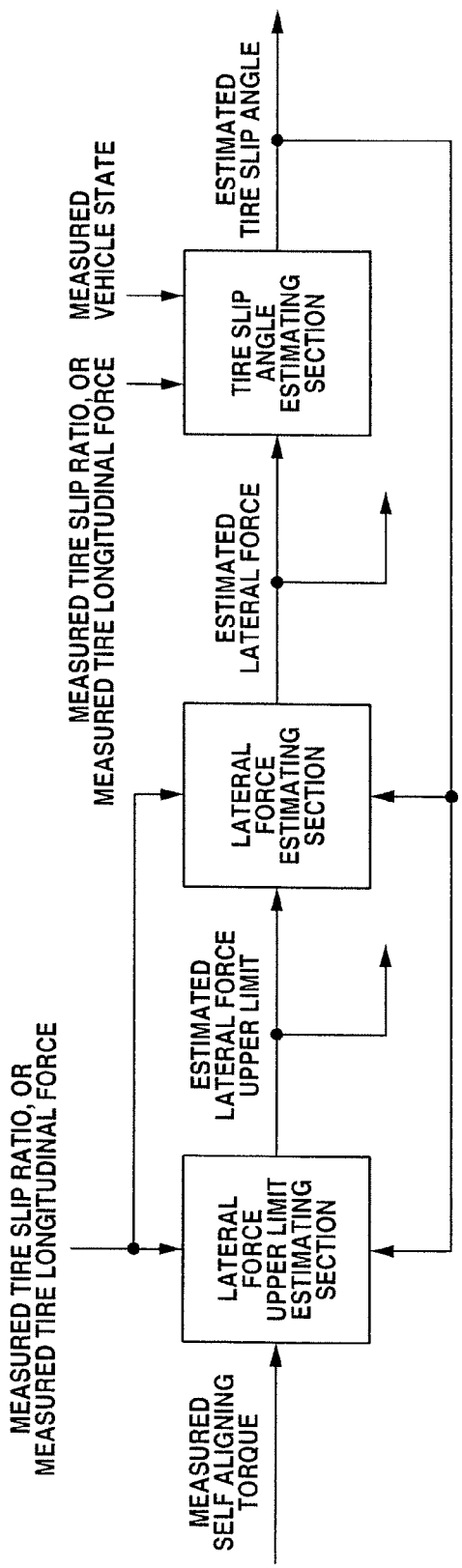

FIGS. 1A and 1B show basic systems for tire state estimation according to the first to eighth embodiments. FIG. 1A shows a case in which a lateral force upper limit is estimated for a tire set that is assumed to be subject to no longitudinal force. FIG. 1B shows a case in which a lateral force upper limit is estimated for a tire set that is assumed to be subject to longitudinal forces. As shown in FIGS. 1A and 1B, each system includes a section referred to as lateral force upper limit estimating section, a section referred to as lateral force estimating section, and a section referred to as tire slip angle estimating section. The system is implemented in a single integrated controller in which the three sections are appropriately configured and programmed, and functionally connected to each other for data communication.

The lateral force upper limit estimating section receives input of a measured tire self aligning torque, and an estimated tire slip angle, and outputs an estimated tire lateral force upper limit. The estimated tire slip angle is outputted from the tire slip angle estimating section. The estimated tire lateral force upper limit is calculated using at least one of an equation set and a map set which is prepared for defining a relationship among tire self aligning torque, tire slip angle, and tire lateral force upper limit. In cases in which the tire set is assumed to be subject to is longitudinal forces, the lateral force upper limit estimating section is further configured to receive input of at least one of a measured tire slip ratio set and a measured tire longitudinal force set, and calculates the estimated tire lateral force upper limit in consideration of effects of such longitudinal forces, as shown in FIG. 1B. The lateral force upper limit estimating section thus constitutes a lateral force upper limit estimator or lateral force upper limit estimating means for calculating an estimated tire lateral force upper limit, on a basis of an estimated tire slip angle calculated by a tire slip angle estimator and a measured tire self aligning torque.

The lateral force estimating section receives input of the estimated tire lateral force upper limit, and the estimated tire slip angle, and outputs an estimated tire lateral force. The estimated tire lateral force is calculated using at least one of an equation set and a map set which is prepared for defining a relationship among tire lateral force upper limit, tire slip angle, and tire lateral force. In cases in which the tire set is assumed to be subject to longitudinal forces, the lateral force estimating section is further configured to receive input of at least one of the measured tire slip ratio set and the measured tire longitudinal force set, and calculates the estimated tire lateral force in consideration of effects of such longitudinal forces, as shown in FIG. 1B.

The tire slip angle estimating section receives input of at least one of the measured tire slip ratio set and the measured tire longitudinal force set, the estimated tire lateral force, and a measured vehicle state, and outputs the estimated tire slip angle. The estimated tire slip angle is calculated using an observer based on a model of vehicle dynamics. The lateral force estimating section and the tire slip angle estimating section thus constitute a tire slip angle estimator or tire slip angle estimating means for calculating an estimated tire slip angle, on a basis of the estimated tire lateral force upper limit calculated by the lateral force upper limit estimator and a measured vehicle state.

Each of the lateral force upper limit estimating section, and the lateral force estimating section may be configured to calculate and output an estimate concerning lateral force, for each tire set for which a measured self aligning torque is given. Suppose example cases in which a single total self aligning torque can be measured for a set of left and right front wheels, but no total self aligning torque can be measured for a set of left and right rear wheels. In such cases, the lateral force upper limit estimating section is configured to calculate and output a single estimated total lateral force upper limit for left and right front wheels, and the lateral force estimating section is configured to calculate and output a single estimated total lateral force for left and right front wheels.

The lateral force upper limit estimating section, and the lateral force estimating section may be adapted to the type of an employed steering system and the type pf an employed drive system. The tire slip angle estimating section may be adapted to the type of an employed observer and the type of a measured vehicle state which depends on the type of the observer.

Each automotive vehicle according to the present embodiments employs one of the following four types of steering system for the front wheel set and one for the rear wheel set:

A1) No steering system;

A2) Steering system in which left and right wheels are mechanically linked to a steering wheel with a fixed gear ratio or a variable gear ratio, and are steered with an assist torque;

A3) Steering system in which left and right wheels are mechanically separated from a steering wheel, mechanically linked to each other, and configured to be actively and electronically steered according to steering wheel angle; and A4) Steering system in which left and right wheels are mechanically separated from a steering wheel, mechanically separated from each other, and configured to be actively and electronically steered according to steering wheel angle independently of each other.

Each automotive vehicle according to the present embodiments employs one of the following two types of drive system for the front wheel set and one for the rear wheel set:

B1) No driving/braking system; and

B2) Driving/braking system in which left and right wheels are subject to driving/braking torques, which may be a system in which a driving torque is distributed through a differential gear into the left and right wheels, or may be a system in which the left and right wheels are driven or braked independently of each other.

For each of front and rear wheel sets, the number of possible combinations of the type of steering system and the type of drive system are eight as a product of four as the number of the steering system types and two as the number of the drive system types, although all the possible combinations are not covered in the present embodiments.

In the present embodiments, each tire slip angle estimating section employs one of the following three types of observer:

C1) Observer, wherein:
measured vehicle state: vehicle lateral acceleration, vehicle yaw rate, and tire steer angle, (and tire longitudinal force or tire slip ratio, if a driving/braking system is provided); and
observer state variable(s): tire slip angle;

C2) Observer, wherein:
measured vehicle state: yaw rate, and tire steer angle, (and tire longitudinal force or tire slip ratio, if a driving/braking system is provided); and
observer state variable(s): tire slip angle, and vehicle yaw rate; and C3) Observer, wherein:
measured vehicle state: tire steer angle, and tire lateral force, (and tire longitudinal force or tire slip ratio, if a driving/braking system is provided); and
observer state variable(s): tire slip angle, and vehicle yaw rate.

There are many possible combinations of the type of steering system, the type of drive system, and the type of observer. However, the present embodiments show the following characterized combinations in which a front wheel set is provided with a steering system.

<Embodiment 1> Front wheel system: A2/B1 type, Rear wheel system: A1/B2 type, and Observer: C1 type.
<Embodiment 2> Front wheel system: A3/B1 type, Rear wheel system: A1/B2 type, and Observer: C1 type.
<Embodiment 3> Front wheel system: A3/B2 type, Rear wheel system: A1/B1 type, and Observer: C1 type.
<Embodiment 4> Front wheel system: A4/B2 type, Rear wheel system: A1/B1 type, and Observer: C1 type.
<Embodiment 5> Front wheel system: A4/B2 type, Rear wheel system: A1/B1 type, and Observer: C2 type.
<Embodiment 6> Front wheel system: A4/B2 type, Rear wheel system: A1/B1 type, and Observer: C3 type.
<Embodiment 7> Front wheel system: A4/B2 type, Rear wheel system: A1/B1 type, and Observer: C3 type.
<Embodiment 8> Front wheel system: A3/B2 type, Rear wheel system: A1/B1 type, and Observer: C1 type.

Naturally, the rear wheel set may be of the same type as the front wheel set, or may be of another type than the front wheel set. For example, the vehicle may include a front wheel set of A2/B1 type as in the first embodiment, and a rear wheel set of A4/B2 type as the front wheel set in the fourth embodiment.

Each lateral force estimating section is configured to output an estimated tire lateral force to the tire slip angle estimating section, whichever combination is employed. Therefore, all the possible combinations of steering system and drive system may be combined with any one of the three type observers of the tire slip angle estimating section. For example, observer C1 in the first to third embodiments may be replaced with observer C2 or C3.

Embodiment 1

The tire state estimator is exemplified in an automotive vehicle wherein:

(Front Wheel System)
A2) Steering system in which left and right wheels are mechanically linked to a steering wheel with a fixed gear ratio or a variable gear ratio, and are steered with an assist torque; and
B1) No driving/braking system;

(Rear Wheel System)
A1) No steering system; and
B2) Driving/braking system in which left and right wheels are subject to driving/braking torques, which may be a system in which a driving torque is distributed through a differential gear into the left and right wheels, or may be a system in which the left and right wheels are driven or braked independently of each other; and (Tire Slip Angle Estimating Section)
C1) Observer, wherein:
measured vehicle state: vehicle lateral acceleration, vehicle yaw rate, and tire steer angle, (and tire longitudinal force or tire slip ratio, if a driving/braking system is provided); and
observer state variable(s): tire slip angle.

Figure 2:
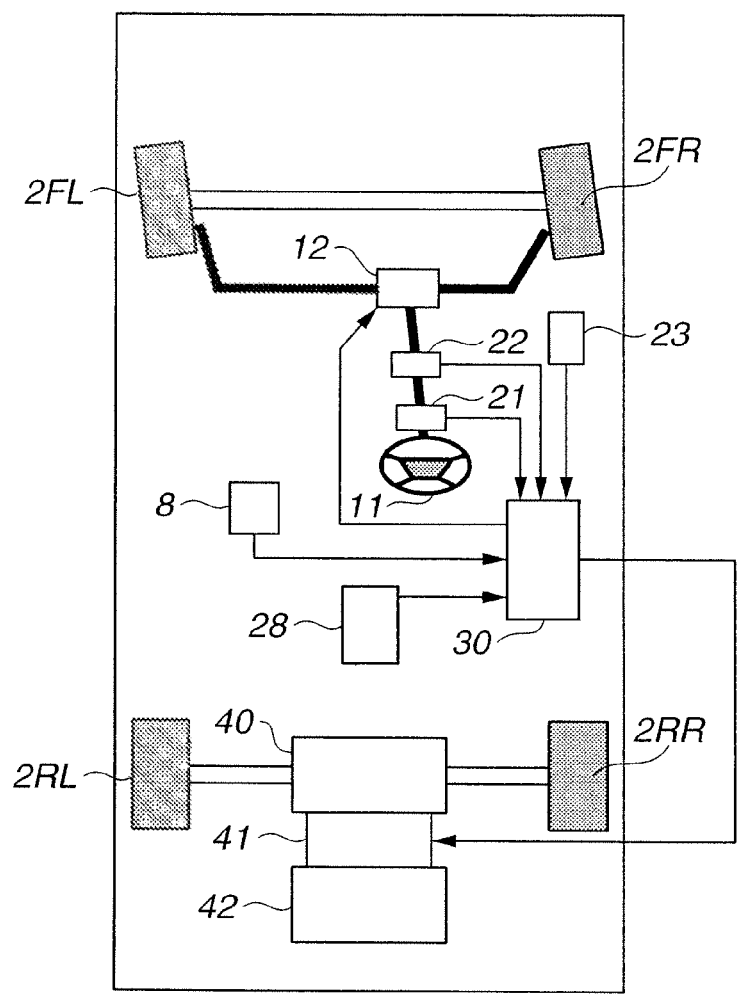
FIG. 2 is a schematic diagram showing configuration of an automotive vehicle provided with a tire state estimator according to the first embodiment.

FIG. 2 schematically shows configuration of the automotive vehicle, in which front and rear wheel systems are implemented as described above, and information is collected which is needed to measure state variables required for tire state estimation with the observer described above.

The vehicle includes a driving motor 40 as a source of driving torque. Driving motor 40 includes an output shaft which is drivingly connected to left and right rear wheels 2RL and 2RR through a differential gear not shown. Driving motor 40 is a three-phase synchronous motor in which a rotor carries a permanent magnet. Driving motor 40 is driven by a driving circuit (motor controller) 41 such as an inverter. Driving circuit 41 receives input of a signal indicative of a desired driving torque from an integrated controller 30, and drives driving motor 40 by electric power from a lithium-ion battery 42 so as to conform the output torque of driving motor 40 to the desired output torque. Driving circuit 41 sends to integrated controller 30 a signal indicative of the output torque of driving motor 40, and a signal indicative of the rotational speed of driving motor 40 which is measured by a rotational speed sensor not shown which is attached to the rotating shaft of driving motor 40.

Left and right front wheels 2FL and 2FR are steered according to rotation of a steering wheel 11 which is adapted to be manipulated by a driver. The rotation of steering wheel 11 is mechanically transmitted through a steering gear not shown. The steering operation is assisted with an assist torque generated by a steering assist motor 12. Steering wheel 11 is provided with a steering wheel torque sensor 22 that measures a steering torque applied from the driver to steering wheel 11.

Integrated controller 30 is configured to receive input of signals outputted by sensors. The sensors are arranged to collect information needed to measure a tire self aligning torque and a state of the vehicle other than the tire self aligning torque. The sensors include an accelerator pedal sensor 23 arranged to measure an accelerator opening APO, a steering wheel angle sensor 21 attached to the rotating shaft of steering wheel 11 and arranged to measure a steering wheel angle STR, a yaw rate sensor 8 arranged to measure a vehicle yaw rate $\gamma$, an acceleration sensor 28 located at the center of mass of the vehicle and arranged to measure a vehicle longitudinal acceleration $a_x$ and a vehicle lateral acceleration $a_y$, and rotational speed sensors adapted for wheels and arranged to measure wheel speeds (wheel angular speeds) $\omega_{FL}$, $\omega_{FR}$, $\omega_{RL}$ and $\omega_{RR}$.

Figure 3:
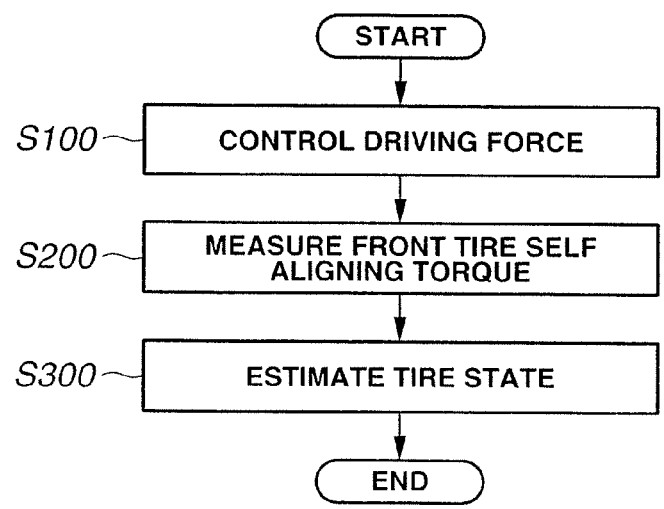
FIG. 3 is a flow chart showing a main process of tire state estimation according to the first to eighth embodiments.

FIG. 3 shows a process which is performed by integrated controller 30. Integrated controller 30 includes a microcomputer, and other parts, such as RAM and ROM. Integrated controller 30 carries out the process of FIG. 3 at intervals of a short time period such as 5 ms.

At Step S100, integrated controller 30 calculates a desired driving torque on a basis of accelerator opening APO measured by accelerator pedal sensor 23 and a vehicle speed V which is obtained as an average of measured wheel speeds $\omega_{FL}$, $\omega_{FR}$, $\omega_{RL}$ and $\omega_{RR}$, and outputs a signal indicative of the desired driving torque to driving circuit 41.

At Step S200, integrated controller 30 calculates a front tire self aligning torque $\tau_{af}$, which is the sum of self aligning torques of left and right front wheels 2FL and 2FR, on a basis of a steering wheel torque $T_{str}$ measured by steering wheel torque sensor 22, and an assist torque $T_{ass}$ generated by steering assist motor 12, using equation (1).

$$\tau_{af} = T_{ass} + T_{str} \tag{1}$$

The front tire self aligning torque $\tau_{af}$ is thus measured in this example, but may be measured by other methods. For example, the front tire self aligning torque $\tau_{af}$ may be measured by a method disclosed in JP2005-8062 in consideration of hysteresis due to friction.

Figure 4:
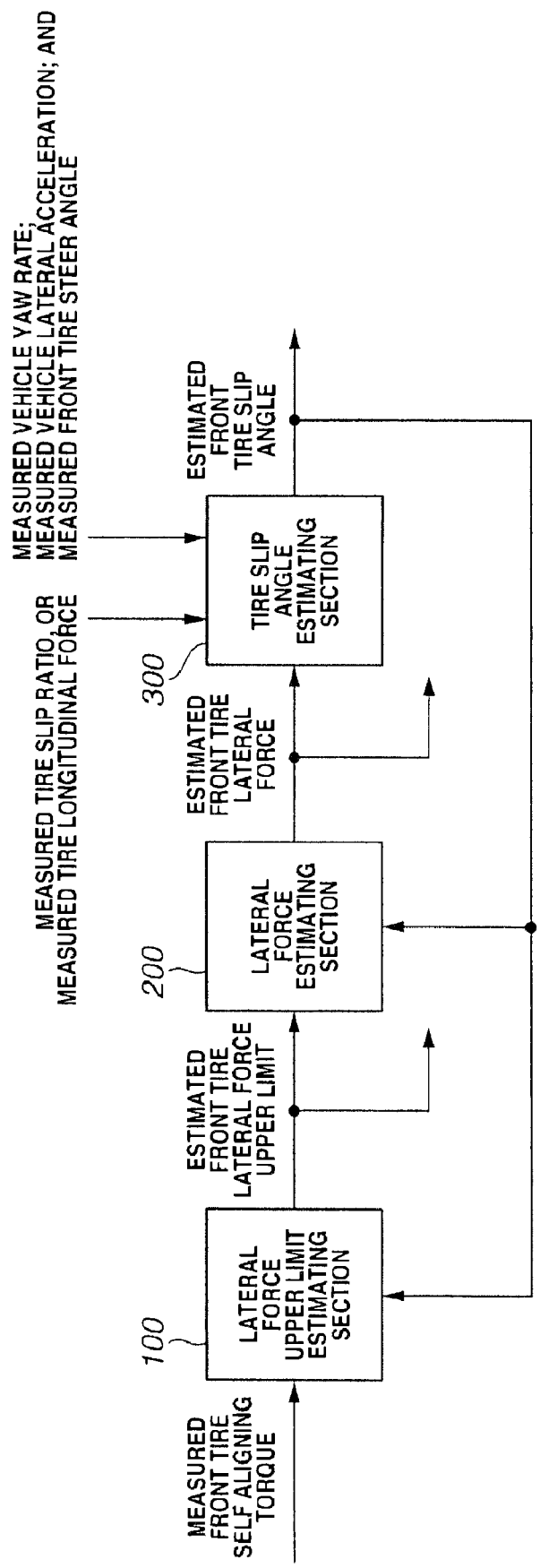
FIG. 4 is a block diagram showing a system for tire state estimation according to the first and second embodiments.

At Step S300, integrated controller 30 carries out a system of tire state estimation shown in FIG. 4. In the configuration described above, the total self aligning torque of left and right front wheels 2FL and 2FR is measured and available for tire state estimation. Accordingly, the lateral force upper limit estimating section is configured to calculate and output an estimated front tire lateral force upper limit as a sum of estimated left and right front tire lateral force upper limits, and the lateral force estimating section is configured to calculate and output an estimated front tire lateral force as a sum of estimated left and right front tire lateral forces.

In FIG. 4, lateral force upper limit estimating section 100 calculates an estimated front tire lateral force upper limit on a basis of the measured front tire self aligning torque calculated at Step S200 and an estimated front tire slip angle outputted by tire slip angle estimating section 300.

For example, the Fiala tire model gives a relationship among self aligning torque $\tau_a$, tire slip angle $\alpha$, tire-road friction coefficient $\mu$, and tire vertical load $F_z$, which is expressed by equation (2).

$$\tau_a = -\left(c_0 + \frac{c_1|\tan\alpha|}{\mu F_z}\right)\left(c_2\tan\alpha + \frac{c_3\tan\alpha|\tan\alpha|}{\mu F_z} + \frac{c_4\tan^3\alpha}{\mu^2 F_z^2}\right) \tag{2}$$

In equation (2), $c_0$, $c_1$, $c_2$, $c_3$, and $c_4$ represent values that depends on tire properties, and are assumed to be constant at least with respect to $\tau a$, $\alpha$, and $\mu F_z$.

Estimated lateral force upper limit $F_{ymax}$ is expressed in terms of tire-road friction coefficient $\mu$ and tire vertical load $F_z$, using equation (3).

$$Fymax = \mu F_z \tag{3}$$

Equation (3) may be modified by multiplying the right side by a factor which is derived from experimental results.

Equations (2) and (3) are reduced to equation (4) with $I_f$ introduced as a reciprocal of $F_{ymax}$.

$$\tau_a = -(c_0 + c_1|\tan\alpha|I_f)(c_2\tan\alpha + c_3\tan\alpha|\tan\alpha|I_f + c_4\tan^3\alpha I_f^2) \tag{4}$$

Lateral force upper limit estimating section 100 substitutes measured front tire self aligning torque $\tau_{af}$ into $\tau_a$, and estimated front tire slip angle $\alpha_{fhat}$, which is last calculated by tire slip angle estimating section 300, into $\alpha$, yielding a third-degree equation of $I_f$. Then, lateral force upper limit estimating section 100 finds a solution of the third-degree equation, and outputs the reciprocal of the solution as estimated front tire lateral force upper limit $F_{yfmax}$.

Calculation of tire-road friction coefficient $\mu$ according to equation (2) requires values of tire vertical load $F_z$, and tire slip angle $\alpha$. In general, it is however difficult to accurately measure or estimate tire vertical load $F_z$, and tire slip angle $\alpha$. According to the present embodiments, $\mu F_z$ is treated as a single variable $I_f$, in consideration that $\mu$ and $F_z$ appear in pairs in equation (2), and $\mu F_z$ is equivalent to the lateral force upper limit. The introduction of $I_f$ eliminates the need of measurement or estimation of $F_z$, which is difficult in general. In addition, tire slip angle $\alpha$ is accurately estimated according to the present embodiments, in contrast to the method disclosed in JP2005-8062 where tire slip angle is calculated on a basis of steering wheel angle using a model of vehicle dynamics with no compensation for errors. Specifically, in the present embodiments, tire slip angle $\alpha$ is accurately estimated by an observer that compares an estimated tire slip angle $\alpha$ with an estimated tire lateral force that is calculated on a basis of the estimated tire slip angle $\alpha$ and a measured self aligning torque, and repeatedly updates the estimated tire slip angle $\alpha$ in consideration of a measured vehicle state, so as to conform the estimated tire slip angle $\alpha$ to the estimated tire lateral force. In summary, the parameters appearing in equation (4) for calculation of $I_f$ are accurately given, and the tire lateral force upper limit (the reciprocal of $I_f$) can be accurately estimated, both for situations where the lateral force upper limit changes transiently, and for situations where the lateral force upper limit is in steady state.

In FIG. 4, lateral force estimating section 200 calculates estimated front tire lateral force $F_{yfhat}$ on a basis of estimated front tire lateral force upper limit $F_{yfmax}$ calculated by lateral force upper limit estimating section 100, and the estimated front tire slip angle calculated by tire slip angle estimating section 300, using a tire model.

For example, the Fiala tire model gives a relationship expressed by equation (5) with $I_f$ introduced.

$$Fy = \begin{cases} c_2\tan\alpha + c_3\tan\alpha|\tan\alpha|I_f + c_4\tan^3\alpha I_f^2 & \text{if } |\alpha| \leq \alpha_{sl} \\ -\dfrac{1}{I_f}\text{sgn}\alpha & \text{else} \end{cases} \tag{5}$$

In equation (5), $I_f$ represents the reciprocal of a lateral force upper limit, $\alpha_{sl}$ represents a tire slip angle value at which a tire lateral force is maximized, and $c_2$, $c_3$ and $c_4$ represent values that depend on tire properties, and are assumed to be constant at least with respect to $F_y$, $\alpha$ and $I_f$. Using equation (5), lateral force estimating section 200 substitutes estimated front tire slip angle $\alpha_{fhat}$ into $\alpha$, the reciprocal of estimated front tire lateral force upper limit $F_{yfmax}$ into $I_f$, and calculates and outputs $F_y$ as estimated front tire lateral force $F_{yfhat}$. Tire slip angle value $\alpha_{sl}$ is given by equation (6).

$$\alpha_{sl} = \tan^{-1}\left(\frac{3}{C_\alpha I_f}\right) \tag{6}$$

In equation (6), $C_\alpha$ represents a cornering power.

Tire slip angle estimating section 300 employs the observer C1 as described above. The observer receives input of estimated front tire lateral force $F_{yfhat}$ outputted from lateral force estimating section 200, and a measured vehicle state, and calculates estimated front tire slip angle $\alpha_{fhat}$ on a basis of estimated front tire lateral force $F_{yfhat}$ and the measured vehicle state, using a model of vehicle dynamics.

The observer is derived as follows. Dynamics of vehicle slip angle β and vehicle yaw rate γ are expressed by equations (7) and (8).

$$\dot{\beta} = \frac{1}{mV}(F_{yf} + F_{yr}) - \gamma \quad (7)$$

$$\dot{\gamma} = \frac{1}{I_z}(aF_{yf} - bF_{yr}) + \frac{d_t}{I_z}\{(F_{xfr} - F_{xrr}) - (F_{xfl} - F_{xrl})\} \quad (8)$$

In equations (7) and (8), $F_{yf}$ represents a front tire lateral force, $F_{yr}$ represents a rear tire lateral force, $I_z$ represents a moment of inertia about a center of mass, m represents a vehicle mass, V represents a vehicle speed, a represents a distance between the center of mass and a front axle, and b represents a distance between the center of mass and a rear axle, $d_t$ represents a half of a tread between left and right wheels, $F_{xfl}$ represents a left front tire longitudinal force, $F_{xfr}$ represents a right front tire longitudinal force, $F_{xrl}$ represents a left rear tire longitudinal force, and $F_{xrr}$ represents a right rear tire longitudinal force. For each tire longitudinal force in equations (7) and (8), substituted is a value for each wheel that is based on a driving/braking torque command value, a measured driving/braking torque obtained by a torque sensor, or an estimated longitudinal force calculated by an observer.

A front tire slip angle at zero front tire steer angle, or the slip angle of the front axle, $\alpha_{f0}$, is expressed by equation (9).

$$\alpha_{f0} = \beta + \frac{a\gamma}{V} \quad (9)$$

Differentiating both sides of equation (9) with respect to time, and using equations (7) and (8), yields equation (10).

$$\dot{\alpha}_{f0} = \left(\frac{1}{mV} + \frac{a^2}{I_z V}\right)F_{yf} + \left(\frac{1}{mV} - \frac{ab}{I_z V}\right)F_{yr} + \frac{ad_t}{I_z V}\{(F_{xfr} + F_{xrr}) - (F_{xfl} + F_{xrl})\} - \gamma \quad (10)$$

Equation (10) is modified into equation (11) to form an observer for $\alpha_{f0}$.

$$\dot{\alpha}_{f0hat} = \left(\frac{1}{mV} + \frac{a^2}{I_z V}\right)F_{yfhat} + \left(\frac{1}{mV} - \frac{ab}{I_z V}\right)F_{yrhat} + \frac{ad_t}{I_z V}\{(F_{xfr} + F_{xrr}) - (F_{xfl} + F_{xrl})\} - \gamma + K(F_{yfhat} - F_{yfmes}) \quad (11)$$

In equation (11), K represents an observer gain, $F_{yrhat}$ represents an estimated rear tire lateral force, and $F_{yfmes}$ represents a measured front tire lateral force. Thus, $\alpha_{f0hat}$ is corrected on a basis of a difference between estimated front tire lateral force $F_{yfhat}$, which is calculated by lateral force estimating section 200, and measured front tire lateral force $F_{yfmes}$, which is obtained on a basis of an actual vehicle state using equation (13) described below.

In this embodiment, estimated rear tire lateral force $F_{yrhat}$ is not given by lateral force estimating section 200. Accordingly, estimated rear tire lateral force $F_{yrhat}$ is calculated on a basis of vehicle lateral acceleration $a_y$ and estimated front tire lateral force $F_{yfhat}$, using equation (12) which represents a balance between front tire lateral force $F_{yf}$ and rear tire lateral force $F_{yr}$.

$$F_{yr} = ma_y - F_{yf} \quad (12)$$

Measured front tire lateral force $F_{yfmes}$ is calculated using equation (13) which is given by combining equations (8) and (12).

$$F_{yfmes} = \frac{1}{a+b}(I_z\dot{\gamma} + bma_y - d_t\{(F_{xfr} - F_{xrr}) - (F_{xfl} - F_{xrl})\}) \quad (13)$$

Finally, estimated front tire slip angle $\alpha_{fhat}$ is calculated on a basis of estimated front axle slip angle $\alpha_{f0hat}$ calculated as an integral of $\dot{\alpha}_{f0hat}$ by the observer based on equation (11), and measured front tire steer angle $\delta_f$, using equation (14) which defines a relationship among front axle slip angle $\alpha_{f0}$, front tire slip angle $\alpha_f$, and front tire steer angle $\delta_f$.

$$\alpha_f = \alpha_{f0} - \delta_f \quad (14)$$

For example, measured front tire steer angle $\delta_f$ is calculated by multiplying steering wheel angle STR by a given overall steering gear ratio.

The observer described above is available for an automotive vehicle provided with steerable rear wheels. In such cases, the foregoing explanation is to be considered under assumption that "front" is replaced with "rear", and tire slip angle estimating section 300 is modified to calculate and output an estimated rear tire slip angle. A rear tire slip angle at zero rear tire steer angle, or the slip angle of the rear axle, $\alpha_{r0hat}$, is calculated by an observer expressed by equation (15).

$$\dot{\alpha}_{r0hat} = \left(\frac{1}{mV} - \frac{ab}{I_z V}\right)F_{yfhat} + \left(\frac{1}{mV} + \frac{b^2}{I_z V}\right)F_{yrhat} - \frac{bd_t}{I_z V}\{(F_{xfr} + F_{xrr}) - (F_{xfl} + F_{xrl})\} - \gamma + K(F_{yrhat} - F_{yrmes}) \quad (15)$$

Estimated front tire lateral force $F_{yfhat}$ in equation (15) is calculated on a basis of vehicle lateral acceleration $a_y$ and estimated rear tire lateral force $F_{yrhat}$, using the relationship between front tire lateral force $F_{yf}$ and rear tire lateral force $F_{yr}$ in equation (12). $F_{yrmes}$ is calculated using equation (16) which is given by combining equations (8) and (12).

$$F_{yrmes} = \frac{1}{a+b}(-I_z\dot{\gamma} + ama_y - d_t\{(F_{xfr} - F_{xrr}) - (F_{xfl} - F_{xrl})\}) \quad (16)$$

Finally, estimated rear tire slip angle $\alpha_{rhat}$ is calculated on a basis of estimated rear axle slip angle $\alpha_{r0hat}$ calculated by the observer expressed by equation (15), and measured rear tire steer angle $\delta_r$, using equation (17) which defines a relationship among rear axle slip angle $\alpha_{r0}$, rear tire slip angle $\alpha_r$, and rear tire steer angle $\delta_r$.

$$\alpha_r = \alpha_{r0} - \delta_r \quad (17)$$

Equation (9) may be modified into equation (18) that includes an additional term of front tire steer angle $\delta_f$.

$$\alpha_{f0} = \beta + \frac{a\gamma}{V} - \delta_f \qquad (18)$$

Applying the treatment described above to equation (18) gives an observer expressed by equation (19) for estimating a front tire slip angle.

$$\alpha_{fhat} = \left(\frac{1}{mV} + \frac{a^2}{I_z V}\right) F_{yfhat} + \left(\frac{1}{mV} - \frac{ab}{I_z V}\right) F_{yrhat} + \frac{ad_t}{I_z V}\{(F_{xfr} + F_{xrr}) - (F_{xfl} + F_{xrl})\} - \gamma - \dot\delta_f + K(F_{yfhat} - F_{yfmes}) \qquad (19)$$

Equation (19) requires a value of a front tire steer angular speed which may be obtained by differentiating a front tire steer angle. For cases in which rear wheels are steerable, equation (20) is similarly given for estimating a rear tire slip angle. Equation (20) requires a value of a rear tire steer angular speed which may be obtained by differentiating a rear tire steer angle.

$$\alpha_{rhat} = \left(\frac{1}{mV} - \frac{ab}{I_z V}\right) F_{yfhat} + \left(\frac{1}{mV} + \frac{b^2}{I_z V}\right) F_{yrhat} - \frac{bd_t}{I_z V}\{(F_{xfr} + F_{xrr}) - (F_{xfl} + F_{xrl})\} - \gamma - \dot\delta_r + K(F_{yrhat} - F_{yrmes}) \qquad (20)$$

Embodiment 2

The tire state estimator is exemplified in an automotive vehicle wherein:

(Front Wheel System)

A3) Steering system in which left and right wheels are mechanically separated from a steering wheel, mechanically linked to each other, and configured to be actively and electronically steered according to steering wheel angle; and B1) No driving/braking system;

(Rear Wheel System)

A1) No steering system; and

B2) Driving/braking system in which left and right wheels are subject to driving/braking torques, which may be a system in which a driving torque is distributed through a differential gear into the left and right wheels, or may be a system in which the left and right wheels are driven or braked independently of each other; and (Tire Slip Angle Estimating Section)

C1) Observer, wherein:

measured vehicle state: vehicle lateral acceleration, vehicle yaw rate, and tire steer angle, (and tire longitudinal force or tire slip ratio, if a driving/braking system is provided); and observer state variable(s): tire slip angle.

The second embodiment differs from the first embodiment in that a front tire steering mechanism is mechanically separated from a steering wheel, and configured to be steered actively and electronically. Accordingly, the front wheel set is subject to no steering torque from the steering wheel. Therefore, the tire state estimator employs another method of measuring front tire self aligning torque, as described below.

Figure 5:
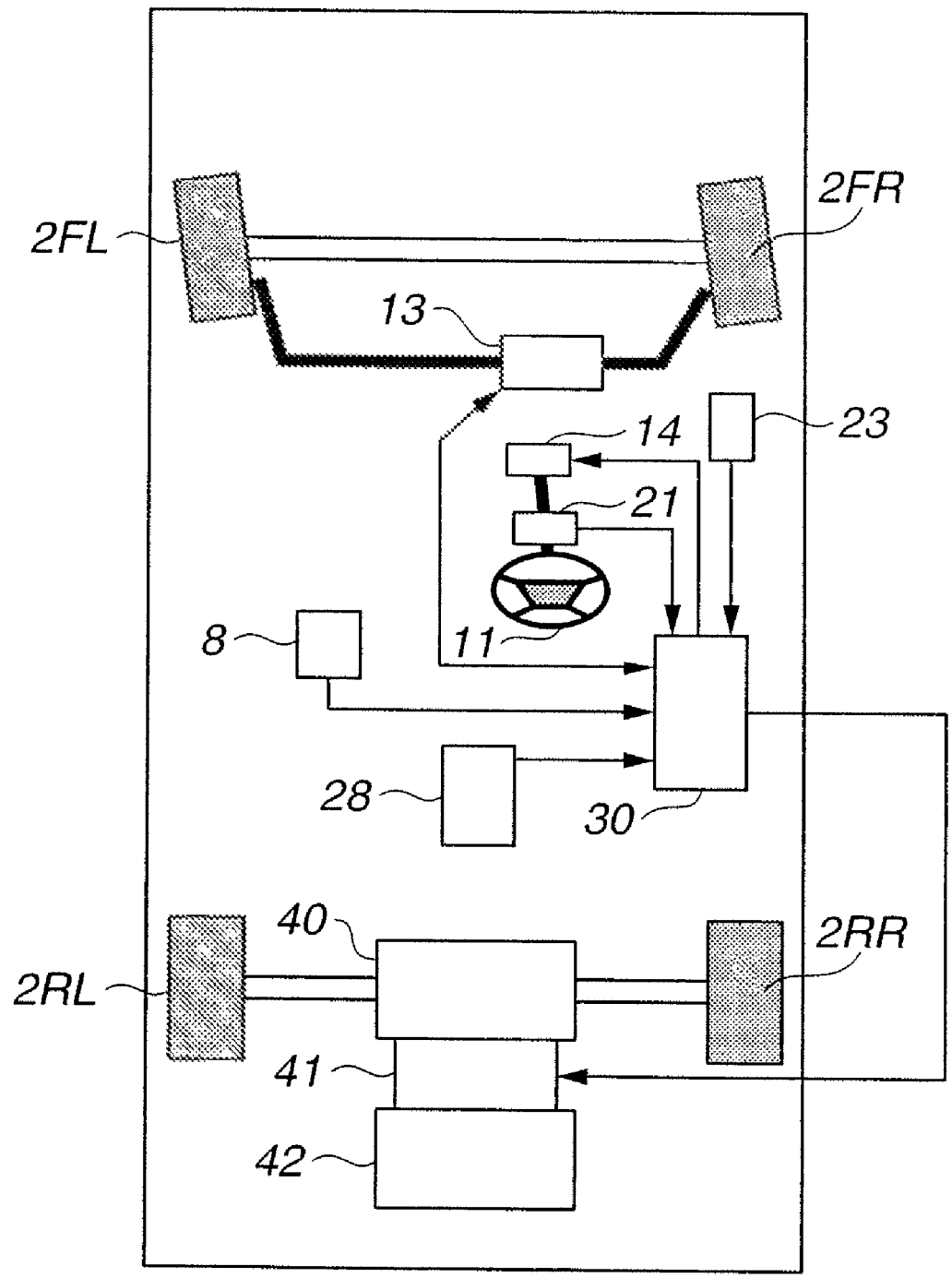
FIG. 5 is a schematic diagram showing configuration of an automotive vehicle provided with a tire state estimator according to the second embodiment.

FIG. 5 schematically shows configuration of the automotive vehicle, in which front and rear wheel systems are implemented as described above, and information is collected which is needed to measure state variables required for tire state estimation with the observer described above.

The rear wheel system of the vehicle is the same as in the first embodiment. The front wheel system differs from that of the first embodiment as follows.

Steering wheel 11 is drivingly connected to a feedback motor 14, and mechanically separated from left and right front wheels 2FL and 2FR. Feedback motor 14 generates and applies a feedback torque to steering wheel 11 according to front total tire self aligning torque. Left and right front wheels 2FL and 2FR are coupled through a steering rack which is actuated by a steering motor 13 so as to cause the steering rack to move in the vehicle lateral direction, and thereby steer left and right front wheels 2FL and 2FR in the same direction. Steering wheel 11 is provided with steering wheel angle sensor 21 for measuring the steering wheel angle of steering wheel 11. Steering motor 13 is controlled by integrated controller 30 according to the measured steering wheel angle. Steering motor 13 is provided with a rotational speed sensor attached to the rotating shaft for measuring the rotational speed. Steering motor 13 sends to integrated controller 30 a signal indicative of the output torque and a signal indicative of the rotational speed.

Integrated controller 30 is configured to receive input of signals indicative of accelerator opening APO measured by accelerator pedal sensor 23, steering wheel angle STR measured by steering wheel angle sensor 21, steering motor torque $\tau_{act}$ and front tire steer angle $\theta_f$ measured by steering motor 13, vehicle yaw rate $\gamma$ measured by yaw rate sensor 8, vehicle longitudinal acceleration $a_x$ and vehicle lateral acceleration $a_y$ measured by acceleration sensor 28, and wheel speeds $\omega_{FL}$, $\omega_{FR}$, $\omega_{RL}$ and $\omega_{RR}$ measured by the rotational speed sensors.

Integrated controller 30 performs the process of FIG. 3 as in the first embodiment, where Steps S100 and S300 are the same as in the first embodiment, but detailed contents of Step S200 are different from those in the first embodiment as follows.

At Step S200, integrated controller 30 calculates measured front tire self aligning torque $\tau_{af}$ on a basis of steering motor torque $\tau_{act}$, using a self aligning torque observer described below. Equation (21) gives a general relationship among steering motor torque $\tau_{act}$, front tire self aligning torque $\tau_{af}$, and front tire steer angle $\theta_f$.

$$I_s \ddot\theta_f + c_s \dot\theta_f = \tau_{act} - \tau_{af} \qquad (21)$$

In equation (21), $I_s$ represents a moment of inertia of a front steering system, and $c_s$ represents a coefficient of friction due to viscosity. Equation (21) is modified to construct a disturbance observer expressed by equation (22) in which disturbance d is equivalent to front tire self aligning torque $\tau_{af}$.

$$\dot x = Ax + B\tau_{act} + K(\theta_f - \theta_{fhat}) \qquad (22)$$

$$x = \begin{bmatrix} \theta_{fhat} \\ \dot\theta_{fhat} \\ d \end{bmatrix}, \ A = \begin{bmatrix} 0 & 1 & 0 \\ 0 & -c_s/I_s & -1/I_s \\ 0 & 0 & 0 \end{bmatrix}, \ B = \begin{bmatrix} 0 \\ 1/I_s \\ 0 \end{bmatrix}$$

In equation (22), K represents an observer gain. Lateral force upper limit estimating section 100 receives input of the disturbance d as a measured front tire self aligning torque.

The configuration and method described above are available for an automotive vehicle provided with steerable rear wheels. In such cases, the foregoing explanation is to be considered under assumption that "front" is replaced with "rear", and tire slip angle estimating section 300 is modified to calculate and output an estimated rear tire slip angle, using the observer expressed by equations (15) and (16).

Embodiment 3

The tire state estimator is exemplified in an automotive vehicle wherein:

(Front Wheel System)

A3) Steering system in which left and right wheels are mechanically separated from a steering wheel, mechanically linked to each other, and configured to be actively and electronically steered according to steering wheel angle; and B2) Driving/braking system in which left and right wheels are subject to driving/braking torques, which may be a system in which a driving torque is distributed through a differential gear into the left and right wheels, or may be a system in which the left and right wheels are driven or braked independently of each other;

(Rear Wheel System)

A1) No steering system; and

B1) No driving/braking system; and (Tire Slip Angle Estimating Section)

C1) Observer, wherein:

measured vehicle state: vehicle lateral acceleration, vehicle yaw rate, and tire steer angle, (and tire longitudinal force or tire slip ratio, if a driving/braking system is provided); and observer state variable(s): tire slip angle.

The third embodiment differs from the second embodiment in that a front wheel system is provided with a driving/braking system. Accordingly, the lateral force upper limit estimating section and the lateral force estimating section are configured to perform calculation in consideration of effects of driving/braking forces.

Figure 6:
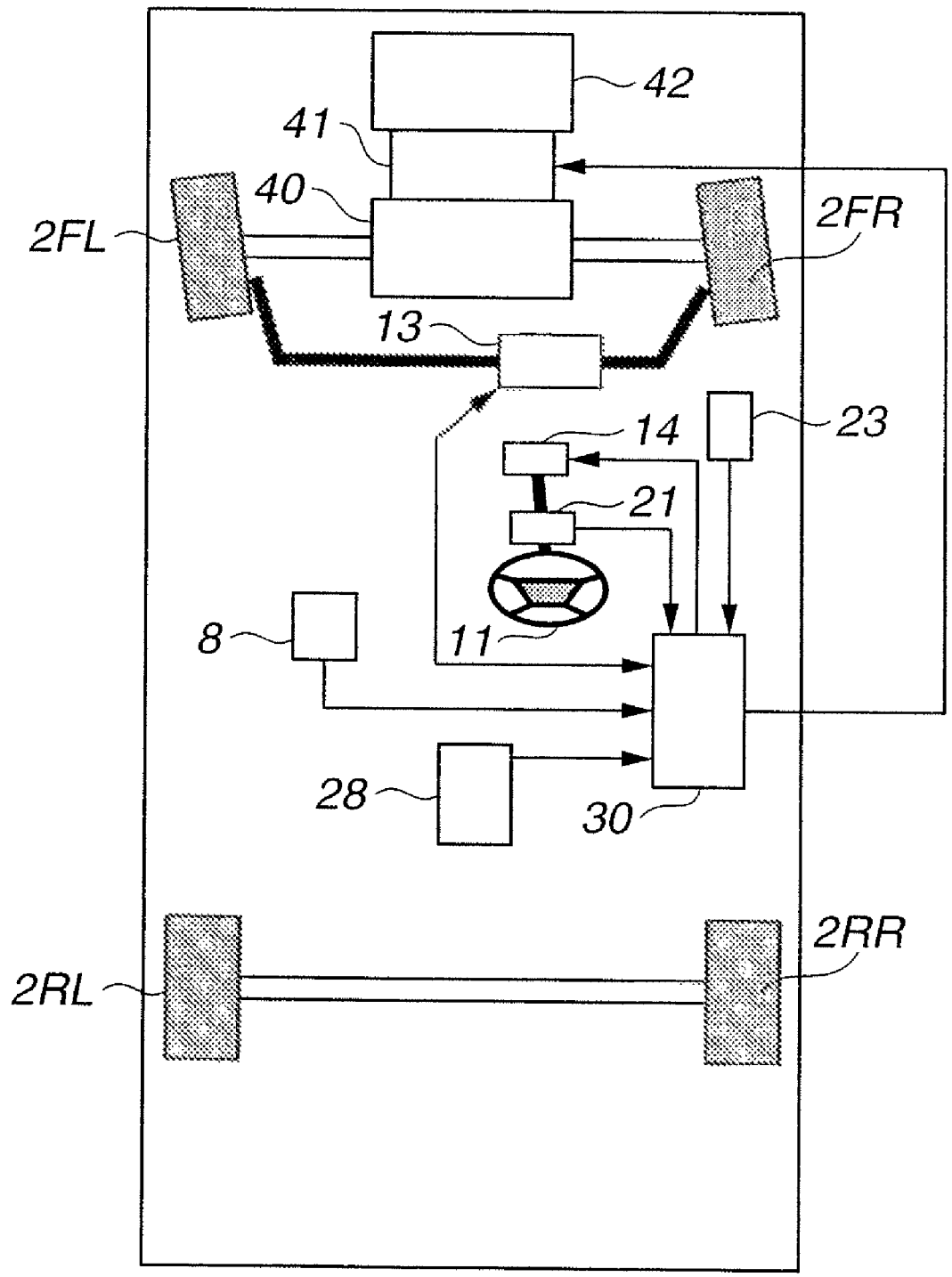
FIG. 6 is a schematic diagram showing configuration of an automotive vehicle provided with a tire state estimator according to the third embodiment.

FIG. 6 schematically shows configuration of the automotive vehicle, in which front and rear wheel systems are implemented as described above, and information is collected which is needed to measure state variables required for tire state estimation with the observer described above.

The vehicle includes driving motor 40 as a source of driving torque. Driving motor 40 is the same as in the first and second embodiments, but the output shaft of driving motor 40 is drivingly connected to left and right front wheels 2FL and 2FR through a differential gear not shown. Driving circuit 41 and lithium-ion battery 42 are the same as in the first and second embodiments. The front tire steering system is the same as in the second embodiment.

As in the second embodiment, integrated controller 30 is configured to receive input of accelerator opening APO measured by accelerator pedal sensor 23, steering wheel angle STR measured by steering wheel angle sensor 21, steering motor torque $\tau_{act}$ and front tire steer angle $\theta_f$ measured by steering motor 13, vehicle yaw rate $\gamma$ measured by yaw rate sensor 8, vehicle longitudinal acceleration $a_x$ and vehicle lateral acceleration $a_y$ measured by acceleration sensor 28, and wheel speeds $\omega_{FL}$, $\omega_{FR}$, $\omega_{RL}$ and $\omega_{RR}$ measured by the rotational speed sensors.

Integrated controller 30 performs the process of FIG. 3 as in the first and second embodiments, where Step S100 is the same as in the first and second embodiments, Step S200 is the same as in the second embodiment, but detailed contents of Step S300 are different from those in the first and second embodiments.

Figure 7:
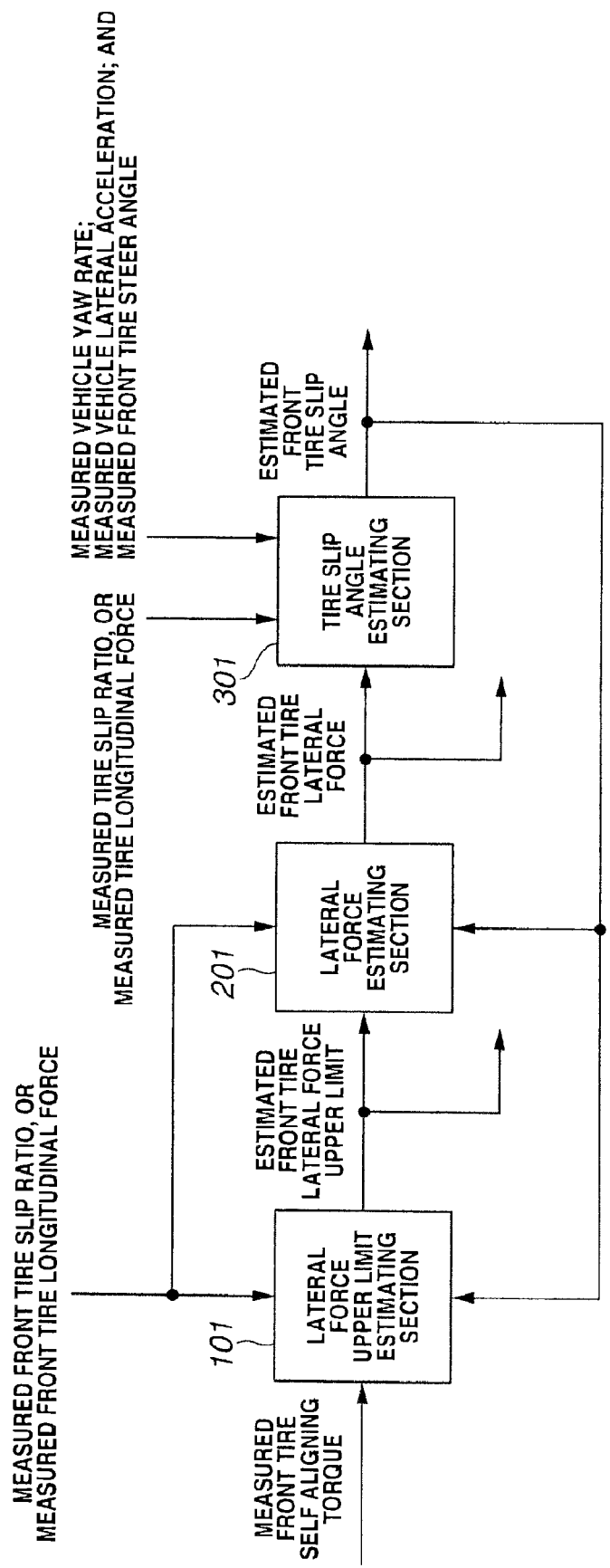
FIG. 7 is a block diagram showing a system for tire state estimation according to the third embodiment.

At Step S300, integrated controller 30 carries out a system of tire state estimation shown in FIG. 7. In the configuration described above, the total self aligning torque of left and right front wheels 2FL and 2FR are measured and available for tire state estimation. Accordingly, the lateral force upper limit estimating section is configured to calculate and output an estimated front tire lateral force upper limit as a sum of estimated left and right front tire lateral force upper limits, and the lateral force estimating section is configured to calculate and output an estimated front tire lateral force as a sum of estimated left and right front tire lateral forces.

The following describes a method of calculating an estimated front tire slip ratio.

In general, tire slip ratio $\sigma$ is expressed by equation (23).

$$\sigma = \begin{cases} \dfrac{u - R_0\omega}{u} & \text{(under braking)} \\ \dfrac{u - R_0\omega}{R_0\omega} & \text{(under driving)} \end{cases} \quad (23)$$

In equation (23), u represents a vehicle speed, $R_0$ represents a tire semidiameter, and $\omega$ represents a wheel speed (wheel angular speed). For example, vehicle speed u is calculated as an average of speeds of the radial peripheries of non-driven left and right rear wheels, using equation (24).

$$u = \frac{R_0(\omega_{RL} + \omega_{RR})}{2} \quad (24)$$

Alternatively, for example, vehicle speed u may be calculated as an integral of vehicle longitudinal acceleration, in cases in which both of front and rear wheel sets are provided with driving systems with no non-driven wheel.

Integrated controller 30 calculates left front tire slip ratio $\sigma_{fl}$ on a basis of left front wheel speed $\omega_{FL}$, calculates right front tire slip ratio $\sigma_{fr}$ on a basis of right front wheel speed $\omega_{FR}$, and calculates a front tire slip ratio as an average of $\sigma_{fl}$ and $\sigma_{fr}$.

The measured tire slip ratio may be calculated on a basis of a measured tire longitudinal force, a last calculated value of the estimated front tire lateral force upper limit, and a last calculated value of the estimated front tire slip angle, using equations (25) and (26) which define a relationship among tire longitudinal force $F_x$, tire lateral force upper limit $\mu F_z$, tire slip angle $\alpha$, and tire slip ratio $\sigma$. Equations (25) and (26) are based on the brush tire model and shown in a document 1 (Masato Abe, "Jidosha No Undo To Seigyo" [Vehicle Dynamics and Control], 1992 Sankaido; ISBN 4-381-10052-2).

Under braking ($\sigma>0$):

$$F_x = \begin{cases} -\dfrac{K_s\sigma}{1-\sigma}\xi_{sb}^2 - 6\mu F_z\cos\theta\left(\dfrac{1}{6} - \dfrac{1}{2}\xi_{sb}^2 + \dfrac{1}{3}\xi_{sb}^3\right) & \text{if } \xi_{sb} = 1 - \dfrac{K_s}{3\mu F_z}\dfrac{\lambda}{1-\sigma} \geq 0 \\ -\mu F_z\cos\theta & \text{if } \xi_{sb} = 1 - \dfrac{K_s}{3\mu F_z}\dfrac{\lambda}{1-\sigma} < 0 \end{cases} \quad (25)$$

Under driving ($\sigma<0$):

$$F_x = \quad (26)$$
$$\begin{cases} -K_s\sigma\xi_{sd}^2 - 6\mu F_z\cos\theta\left(\dfrac{1}{6} - \dfrac{1}{2}\xi_{sd}^2 + \dfrac{1}{3}\xi_{sd}^3\right) & \text{if } \xi_{sd} = 1 - \dfrac{K_s}{3\mu F_z}\lambda \geq 0 \\ -\mu F_z\cos\theta & \text{if } \xi_{sd} = 1 - \dfrac{K_s}{3\mu F_z}\lambda < 0 \end{cases}$$

In equations (25) and (26), $K_s$ represents a value that depends on tire properties and is assumed to be constant at least with respect to $\alpha$, $\sigma$, $F_x$ and $\mu F_z$, and $\theta$ and $\lambda$ represent functions of tire slip angle $\alpha$ and tire slip ratio $\sigma$.

Calculation of tire slip ratio based on equations (25) and (26) requires to solve a high-degree equation and thereby requires a high load of calculation. To reduce the load of calculation, the relationship expressed by equations (25) and (26) may be stored beforehand as a map in integrated controller 30, and tire slip ratio may be calculated on a basis of tire longitudinal force, lateral force upper limit, and tire slip angle $\alpha$, using the map. Alternatively, tire slip ratio may be calculated by a search method such as the Newton method.

The measured tire longitudinal force to be substituted into $F_x$ in equations (25) and (26) may be a value that is based on an outputted driving/braking torque, or a measured driving/braking torque obtained by an additional torque sensor, or an estimated driving/braking torque calculated by an observer.

In FIG. 7, lateral force upper limit estimating section 101 calculates an estimated front tire lateral force upper limit on a basis of the measured front tire self aligning torque calculated at Step S200 and an estimated front tire slip angle outputted by tire slip angle estimating section 301.

In contrast to the first embodiment where the Fiala tire model is employed in no consideration of driving/braking forces, the brush tire model is employed for consideration of effects of driving/braking force on lateral force in the third embodiment. The brush tire model gives a relationship among tire slip ratio $\sigma$, self aligning torque $\tau_a$, tire slip angle $\alpha$, tire-road friction coefficient $\mu$, and tire vertical load $F_z$, which is expressed by equations (27) and (28). Equations (27) and (28) are shown in document 1.

Under braking ($\sigma>0$):

$$\tau_a = \begin{cases} \dfrac{lK_\alpha\tan\alpha}{2(1-\sigma)}\xi_{sb}^2\left(1 - \dfrac{4}{3}\xi_{sb}\right) - & \text{if } \xi_{sb} = 1 - \dfrac{K_s}{2\mu F_z}\dfrac{\lambda}{1-\sigma} \geq 0 \\ \dfrac{3}{2}l\mu F_z\sin\theta\xi_{sb}^2(1-\xi_{sb})^2 + & \\ \dfrac{2lK_s\sigma\tan\alpha}{3(1-\sigma)^2}\xi_{sb}^3 + & \\ \dfrac{3l(\mu F_z)^2\sin\theta\cos\theta}{5K_\alpha}(1 - 10\xi_{sb}^3 + 15\xi_{sb}^4 - 6\xi_{sb}^5) & \\ \dfrac{3l(\mu F_z)^2\sin\theta\cos\theta}{5K_\alpha} & \text{if } \xi_{sb} = 1 - \dfrac{K_s}{3\mu F_z}\dfrac{\lambda}{1-\sigma} < 0 \end{cases} \quad (27)$$

Under driving ($\sigma<0$):

$$\tau_a = \begin{cases} \dfrac{l}{2}K_\alpha(1+\sigma)\tan\alpha\xi_{sd}^2\left(1 - \dfrac{4}{3}\xi_{sd}\right) - & \text{if } \xi_{sd} = 1 - \dfrac{K_s}{3\mu F_z}\lambda \geq 0 \\ \dfrac{3}{2}l\mu F_z\sin\theta\xi_{sd}^2(1-\xi_{sd})^2 + & \\ \dfrac{2}{3}lK_s(1+\sigma)\sigma\tan\alpha\xi_{sd}^3 + & \\ \dfrac{3l(\mu F_z)^2\sin\theta\cos\theta}{5K_\alpha}(1 - 10\xi_{sd}^3 + 15\xi_{sd}^4 - 6\xi_{sd}^5) & \\ \dfrac{3l(\mu F_z)^2\sin\theta\cos\theta}{5K_\alpha} & \text{if } \xi_{sd} = 1 - \dfrac{K_s}{3\mu F_z}\lambda < 0 \end{cases} \quad (28)$$

In equations (27) and (28), l, $K_\alpha$, and $K_s$ represent values that depend on tire properties and are assumed to be constant at least with respect to $\alpha$, $\sigma$, $\tau_a$ and $\mu F_z$, and $\theta$ and $\lambda$ represent functions of tire slip angle $\alpha$ and tire slip ratio $\sigma$.

As in the first embodiment, in consideration that equation (3) defines the relationship among estimated lateral force upper limit $F_{ymax}$, tire-road friction coefficient $\mu$, and tire vertical load $F_z$, and $\mu$ and $F_z$ appear in the form of $\mu F_z$ in equations (27) and (28), $\mu F_z$ is calculated as $F_{ymax}$ on a basis of front tire self aligning torque $\tau_{af}$, estimated front tire slip angle $\alpha_{fhat}$ and front tire slip ratio $\sigma_f$ using equations (27) and (28).

Figure 8:
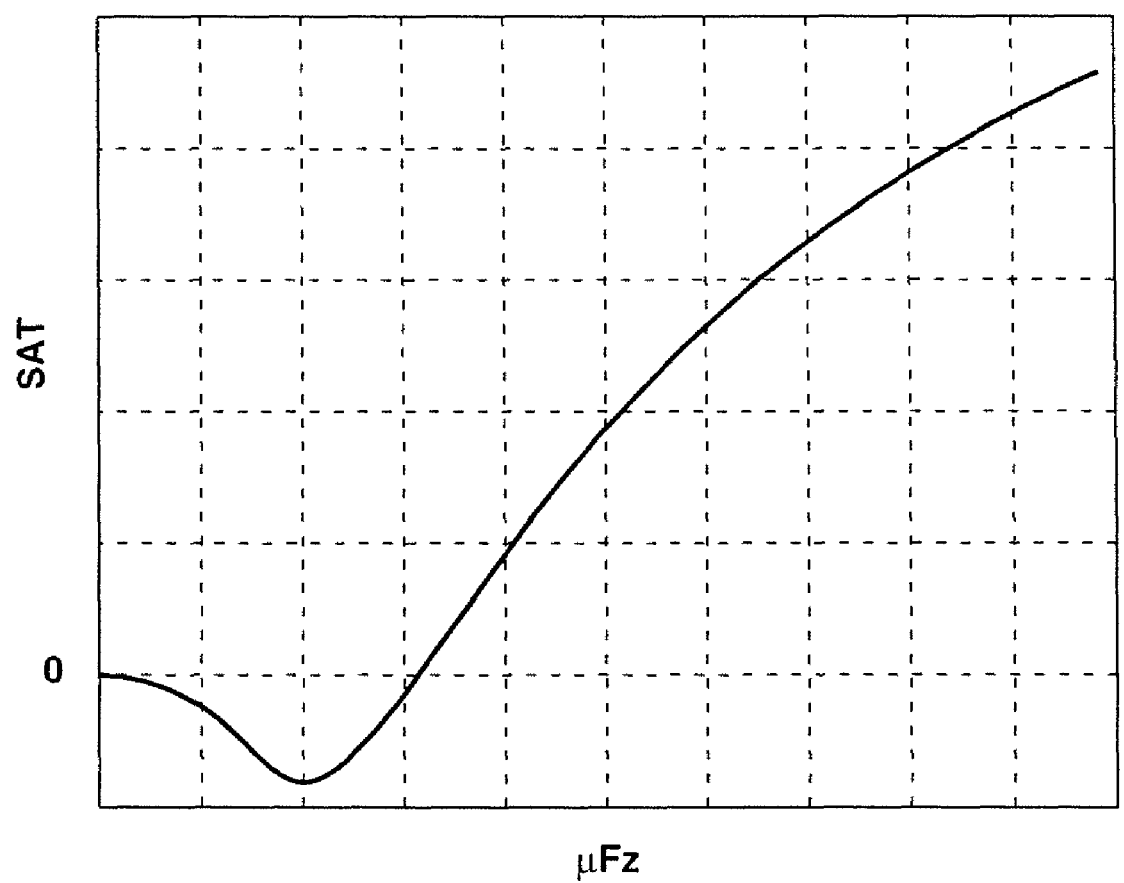
FIG. 8 is a graphic diagram showing a relationship between lateral force upper limit and self aligning torque.

Equations (27) and (28) are somewhat complicated and include bifurcation. Accordingly, equations (27) and (28) are solved by an iterative calculation method such as the Newton method so as to find a value of $\mu F_z$ with which a value of equation (27) or (28) conforms to measured front tire self aligning torque $\tau_{af}$. Since situations are possible in which two valid values of $\mu F_z$ exist with respect to a single self aligning torque as shown in FIG. 8, a first iterative calculation process is started with $\mu F_z$ set to an initial value of 0, and a second iterative calculation process is started with $\mu F_z$ set to an initial value of an adequately large value. Then, one of the two found values of $\mu F_z$ is selected which is relatively close to a last calculated value of $\mu F_z$.

Equation (27) and (28) may be combined with equations (25) and (26) in order to create a map set or an equation set for finding a value of estimated lateral force upper limit $F_{ymax}$ ($=\mu F_z$) on a basis of tire longitudinal force $F_x$, tire slip angle $\alpha$, and self aligning torque $\tau_a$.

The calculation of estimated lateral force upper limit $F_{ymax}$ in consideration of driving/braking forces is effective for accurate estimation of tire lateral force and tire lateral force upper limit under braking or driving.

In FIG. 7, lateral force estimating section 201 calculates estimated front tire lateral force $F_{yfhat}$ on a basis of estimated front tire lateral force upper limit $F_{yfmax}$ outputted by lateral force upper limit estimating section 101, estimated front tire slip angle $\alpha_{fhat}$ outputted by tire slip angle estimating section 301, and measured front tire slip ratio $\sigma_f$, using a tire model.

For example, lateral force estimating section 201 employs the brush tire model for consideration of tire slip ratio due to driving/braking forces, as lateral force upper limit estimating section 101. The brush tire model gives a relationship expressed by equations (29) and (30) which define a relationship among tire slip ratio $\sigma$, lateral force $F_y$, tire slip angle $\alpha$, tire-road friction coefficient $\mu$, and tire vertical load $F_z$. Equations (29) and (30) are shown in document 1.

Under braking ($\sigma > 0$):

Lateral force estimating section 201 calculates estimated front tire lateral force $F_{yfhat}$ on a basis of estimated front tire lateral force upper limit $F_{yfmax}$ ($=\mu F_z$) outputted from lateral force upper limit estimating section 101, and estimated front tire slip angle $\alpha_{fhat}$ outputted from tire slip angle estimating section 301, using equations (29) and (30).

Equation (29) and (30) may be combined with equations (25) and (26) in order to create a map set or an equation set for finding a value of estimated front tire lateral force $F_{yfhat}$ on a basis of tire longitudinal force $F_x$, tire slip angle $\alpha$, and estimated lateral force upper limit $F_{ymax}$.

In FIG. 7, tire slip angle estimating section 301 is the same as tire slip angle estimating section 300 in the first embodiment.

Lateral force upper limit estimating section 101 and lateral force estimating section 201 based on the brush tire model may be applied to the vehicles of the first and second embodiments in which the front wheel set is provided with no drive system. This is effective for more accurate estimation during braking.

The configuration and method described above are available for an automotive vehicle provided with steerable rear wheels. In such cases, the foregoing explanation is to be considered under assumption that "front" is replaced with "rear", and tire slip angle estimating section 301 is modified to calculate and output an estimated rear tire steer angle, using the observer expressed by equations (15) and (16).

Driving motor 40 may be replaced with another type driving source such as an internal combustion engine.

Embodiment 4

The tire state estimator is exemplified in an automotive vehicle wherein:

(Front Wheel System)

A4) Steering system in which left and right wheels are mechanically separated from a steering wheel, mechanically separated from each other, and configured to be actively and electronically steered according to steering wheel angle independently of each other; and B2) Driving/braking system in which left and right wheels are subject to driving/braking torques, which may be a system in which a driving torque is distributed through a differential gear into the left and right wheels, or may be a system in which the left and right wheels are driven or braked independently of each other;

$$F_y = \begin{cases} -\dfrac{K_\alpha \tan\alpha}{1-\sigma}\xi_{sb}^2 - 6\mu F_z \sin\theta\left(\dfrac{1}{6} - \dfrac{1}{2}\xi_{sb}^2 + \dfrac{1}{3}\xi_{sb}^3\right) & \text{if } \xi_{sb} = 1 - \dfrac{K_s}{3\mu F_z}\dfrac{\lambda}{1-\sigma} \geq 0 \\ -\mu F_z \sin\theta & \text{if } \xi_{sb} = 1 - \dfrac{K_s}{3\mu F_z}\dfrac{\lambda}{1-\sigma} < 0 \end{cases} \quad (29)$$

Under driving ($\sigma < 0$):

$$F_y = \begin{cases} -K_\alpha(1+\sigma)\tan\alpha\,\xi_{sd}^2 - 6\mu F_z \sin\theta\left(\dfrac{1}{6} - \dfrac{1}{2}\xi_{sd}^2 + \dfrac{1}{3}\xi_{sd}^3\right) & \text{if } \xi_{sd} = 1 - \dfrac{K_s}{3\mu F_z}\lambda \geq 0 \\ -\mu F_z \sin\theta & \text{if } \xi_{sd} = 1 - \dfrac{K_s}{3\mu F_z}\lambda < 0 \end{cases} \quad (30)$$

(Rear Wheel System)
  A1) No steering system; and
  B1) No driving/braking system; and (Tire Slip Angle Estimating Section)
  C1) Observer, wherein:
    measured vehicle state: vehicle lateral acceleration, vehicle yaw rate, and tire steer angle, (and tire longitudinal force or tire slip ratio, if a driving/braking system is provided); and
    observer state variable(s): tire slip angle.

The fourth embodiment differs from the third embodiment in that left and right wheels are mechanically separated from a steering wheel, mechanically separated from each other, and configured to be actively and electronically steered according to steering wheel angle independently of each other. Self aligning torque can be measured individually for left and right front tires, and therefore, tire lateral force upper limit and tire lateral force can be estimated individually for left and right front tires. Moreover, each of left and right front wheels is provided with an independent drive system.

Figure 9:
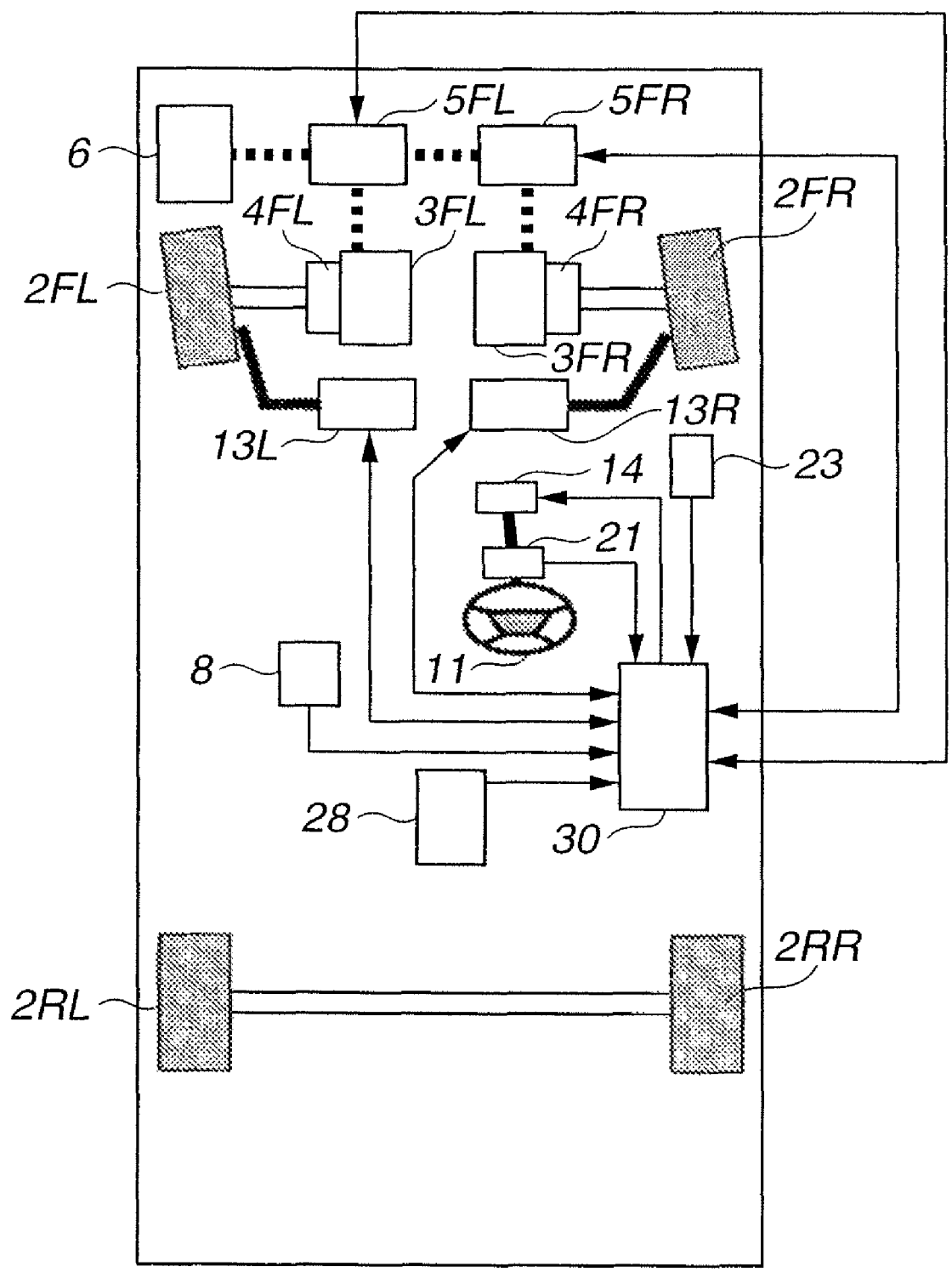
FIG. 9 is a schematic diagram showing configuration of an automotive vehicle provided with a tire state estimator according to the fourth and fifth embodiments.

FIG. 9 schematically shows configuration of the automotive vehicle, in which front and rear wheel systems are implemented as described above, and information is collected which is needed to measure state variables required for tire state estimation with the observer described above.

The vehicle includes electric motors 3FL and 3FR as sources of driving torque. Electric motor 3FL includes a rotating output shaft drivingly connected to left front wheel 2FL through a speed reducer 4FL, whereas electric motor 3FR includes a rotating output shaft drivingly connected to right front wheel 2FR through a speed reducer 4FR. Electric motors 3FL and 3FR have the same characteristics of output, speed reducers 4FL and 4FR have the same reduction ratio, and left and right front wheels 2FL and 2FR have the same semidiameter.

Each of electric motors 3FL and 3FR is a three-phase synchronous motor in which a rotor carries a permanent magnet. Electric motors 3FL and 3FR are driven by driving circuits 5FL and 5FR. Each of driving circuits 5FL and 5FR receives input of a signal indicative of a desired torque from integrated controller 30, and drives a respective one of electric motors 3FL and 3FR by electric power from a lithium-ion battery 6 so as to conform the output torque (driving torque or regenerative braking torque) of electric motors 3FL and 3FR to the desired torque. Each of driving circuits 5FL and 5FR sends to integrated controller 30 a signal indicative of the output torque of the motor, and a signal indicative of rotational speed of the motor which is measured by a rotational speed sensor not shown which is attached to the rotating output shaft.

Steering wheel 11 is drivingly connected to feedback motor 14, and mechanically separated from left and right front wheels 2FL and 2FR. Feedback motor 14 generates and applies a feedback torque to steering wheel 11 according to front total tire self aligning torque. Left and right front wheels 2FL and 2FR are actuated by steering motors 13L and 13R, respectively, independently of each other. Steering wheel 11 is provided with steering wheel angle sensor 21 for measuring the steering wheel angle of steering wheel 11. Steering motors 13L and 13R are controlled by integrated controller 30 according to the measured steering wheel angle. Each of steering motors 13L and 13R is provided with a rotational speed sensor attached to the rotating shaft for measuring the rotational speed. Each of steering motors 13L and 13R sends to integrated controller 30 a signal indicative of the output torque and a signal indicative of the rotational speed.

Integrated controller 30 is configured to receive input of signals indicative of accelerator opening APO measured by accelerator pedal sensor 23, steering wheel angle STR measured by steering wheel angle sensor 21, steering motor torque $\tau_{actl}$ and left front tire steer angle $\theta_{fl}$ measured by steering motor 13L, steering motor torque $\tau_{actr}$ and right front tire steer angle $\theta_{fr}$ measured by steering motor 13R, driving motor torque $T_{fl}$ and left front wheel speed $\omega_{FL}$ measured by electric motor 3FL, driving motor torque $T_{fr}$ and right front wheel speed $\omega_{FR}$ measured by electric motor 3FR, vehicle yaw rate $\gamma$ measured by yaw rate sensor 8, vehicle longitudinal acceleration $a_x$ and vehicle lateral acceleration $a_y$ measured by acceleration sensor 28, and wheel speeds $\omega_{RL}$ and $\omega_{RR}$ measured by the rotational speed sensors attached to the left and rear wheels.

Integrated controller 30 performs the process of FIG. 3 as in the first to third embodiments, where detailed contents of Steps S100 to S300 are different from those in the first to third embodiments.

At Step S100, integrated controller 30 calculates a vehicle speed V on a basis of an average of non-driven left and right rear wheel speeds $\omega_{RL}$ and $\omega_{RR}$, sets a desired driving force tFD on a basis of vehicle speed V and accelerator opening APO, and sets a force tFY desired to generate yawing moment due to driving/braking force on a basis of steering wheel angle STR and vehicle speed V. Then, integrated controller 30 calculates left and right front wheel driving motor torque command values tTFL and tTFR on a basis of desired driving force tFD and force tFY, using equations (31) and (32).

$$tTFL = tFD - tFY/R_0 \quad (32)$$

$$tTFR = tFD + tFY/R_0 \quad (33)$$

In equations (32) and (33), $R_0$ represents a tire semidiameter.

At Step S200, integrated controller 30 calculates measured left and right front tire self aligning torques $\tau_{afl}$ and $\tau_{afr}$ on a basis of left and right steering motor torques $\tau_{actl}$ and $\tau_{actr}$, respectively, by individually using the self aligning torque observer described in the second embodiment.

Figure 10:
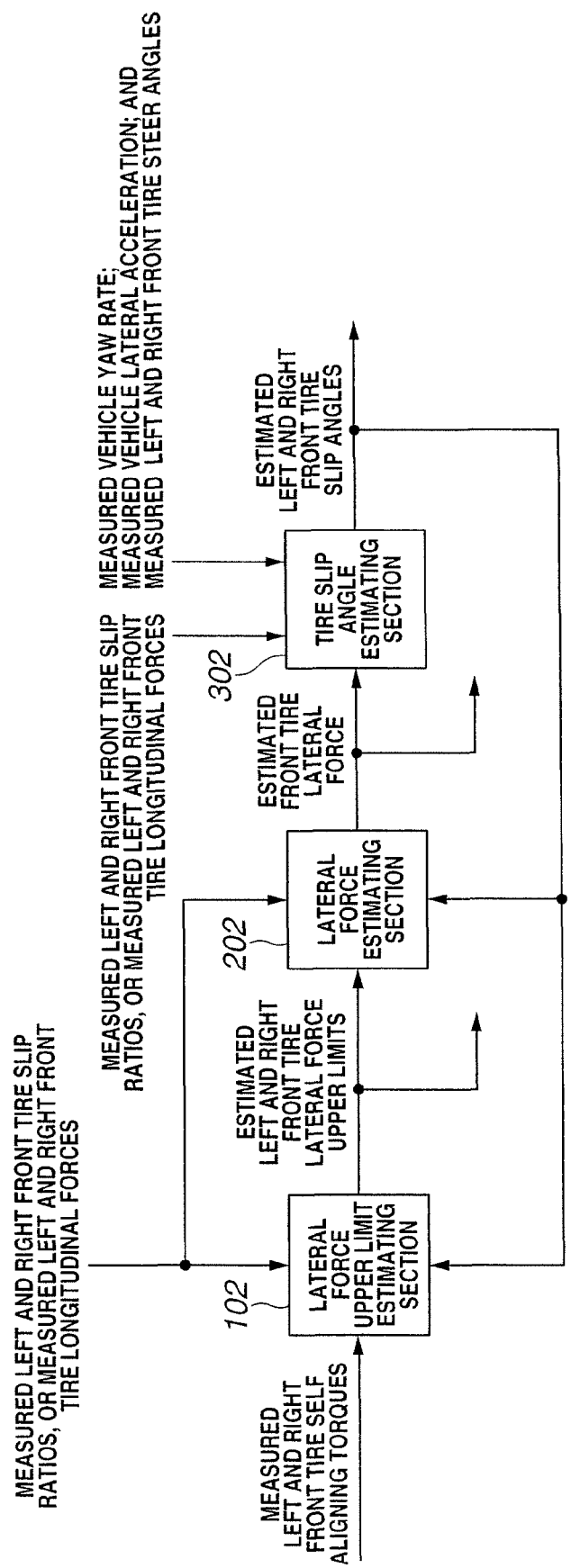
FIG. 10 is a block diagram showing a system for tire state estimation according to the fourth embodiment.

At Step S300, integrated controller 30 carries out a system of tire state estimation shown in FIG. 10. In the configuration described above, the self aligning torques of left and right front wheels 2FL and 2FR are measured independently of each other and available for tire state estimation independently of each other. Accordingly, the lateral force upper limit estimating section can obtain estimated left and right front tire lateral force upper limits, and the lateral force estimating section can obtain estimated left and right front tire lateral forces.

First, left and right front tire slip ratios $\sigma_{fl}$ and $\sigma_{fr}$ are calculated on a basis of left and right front wheel speeds $\omega_{FL}$ and $\omega_{FR}$, using equation (23) shown in the third embodiment.

In FIG. 10, lateral force upper limit estimating section 102 estimates left and right front tire lateral force upper limits $F_{yflmax}$ and $F_{yfrmax}$ on a basis of the measured left and right front tire self aligning torques calculated at Step S200, the estimated left and right front tire slip angles $\alpha_{flhat}$ and $\alpha_{frhat}$ outputted by tire slip angle estimating section 302, and the measured left and right front tire slip ratios $\sigma_{fl}$ and $\sigma_{fr}$ or measured left and right front tire longitudinal forces $F_{xfl}$ and $F_{xfr}$, using the method shown in the third embodiment.

Lateral force estimating section 202 calculates estimated left and right front tire lateral forces $F_{yflhat}$ and $F_{yfrhat}$ on a basis of the estimated left and right front tire lateral force upper limits $F_{yflmax}$ and $F_{yfrmax}$ outputted by lateral force upper limit estimating section 102, the estimated left and right front tire slip angles $\alpha_{flhat}$ and $\alpha_{frhat}$ outputted by tire slip angle estimating section 302, and the measured left and right front tire slip ratios $\sigma_{fl}$ and $\sigma_{fr}$ or measured left and right front tire longitudinal forces $F_{xfl}$ and $F_{xfr}$, individually applying to left and right front wheels the method based on the brush tire model shown in the third embodiment. Then, lateral force estimating section 202 outputs the sum of estimated left and right front tire lateral forces $F_{yflhat}$ and $F_{yfrhat}$ as estimated front tire lateral force $F_{yfhat}$.

Tire slip angle estimating section 302 calculates an estimated front axle slip angle $\alpha_{f0hat}$ at the central point between the left and right wheels, on a basis of estimated front tire lateral force $F_{yfhat}$ calculated by lateral force estimating section 202, a measured vehicle yaw rate, a measured vehicle lateral acceleration, measured left and right front tire steer angles, and measured left and right front tire longitudinal forces, using the observer expressed by equation (11) shown in the first embodiment. Then, tire slip angle estimating section 302 calculates estimated left and right front tire slip angles $\alpha_{flhat}$ and $\alpha_{frhat}$ on a basis of estimated slip angle $\alpha_{f0hat}$ and left and right front tire steer angles $\delta_{fl}$ and $\delta_{fr}$, using equations (33) and (34).

$$\alpha_{flhat} = \alpha_{fhat} - \delta_{fl} \tag{33}$$

$$\alpha_{frhat} = \alpha_{fhat} - \delta_{fr} \tag{34}$$

The configuration and method described above are available for an automotive vehicle provided with steerable rear wheels. In such cases, the foregoing explanation is to be considered under assumption that "front" is replaced with "rear", and tire slip angle estimating section 302 is modified to calculate an estimated rear axle slip angle $\alpha_{rhat}$ at the central point between left and right rear wheels, using the observer expressed by equation (15), and then calculates estimated left and right rear tire slip angles $\alpha_{rlhat}$ and $\alpha_{rrhat}$ on a basis of estimated slip angle $\alpha_{rhat}$ and left and right front tire steer angles $\delta_{rl}$ and $\delta_{rr}$, using equations (35) and (36).

$$\alpha_{rlhat} = \alpha_{rhat} - \delta_{rl} \tag{35}$$

$$\alpha_{rrhat} = \alpha_{rhat} - \delta_{rr} \tag{36}$$

In cases in which the vehicle is provided with four wheels which are actively and electronically steerable independently of each other, estimated front and rear tire lateral forces $F_{yfhat}$ and $F_{yrhat}$ may be individually calculated on a basis of tire slip angle and estimated lateral force upper limit by lateral force estimating section 202, without using equation (12) which defines a balance between front and rear tire lateral forces.

Driving motor 40 may be replaced with another type driving source such as an internal combustion engine.

Embodiment 5

The tire state estimator is exemplified in an automotive vehicle wherein:

(Front Wheel System)

A4) Steering system in which left and right wheels are mechanically separated from a steering wheel, mechanically separated from each other, and configured to be actively and electronically steered according to steering wheel angle independently of each other; and B2) Driving/braking system in which left and right wheels are subject to driving/braking torques, which may be a system in which a driving torque is distributed through a differential gear into the left and right wheels, or may be a system in which the left and right wheels are driven or braked independently of each other;

(Rear Wheel System)

A1) No steering system; and

B1) No driving/braking system; and (Tire Slip Angle Estimating Section)

C2) Observer, wherein:

measured vehicle state: yaw rate, and tire steer angle, (and tire longitudinal force or tire slip ratio, if a driving/braking system is provided); and observer state variable(s): tire slip angle, and vehicle yaw rate.

The fifth embodiment differs from the fourth embodiment in that tire slip angle estimating section 303 employs an observer different from that of tire slip angle estimating section 302 of the fourth embodiment. The vehicle has the same construction as in the fourth embodiment shown in FIG. 9 except tire slip angle estimating section 303.

Figure 11:
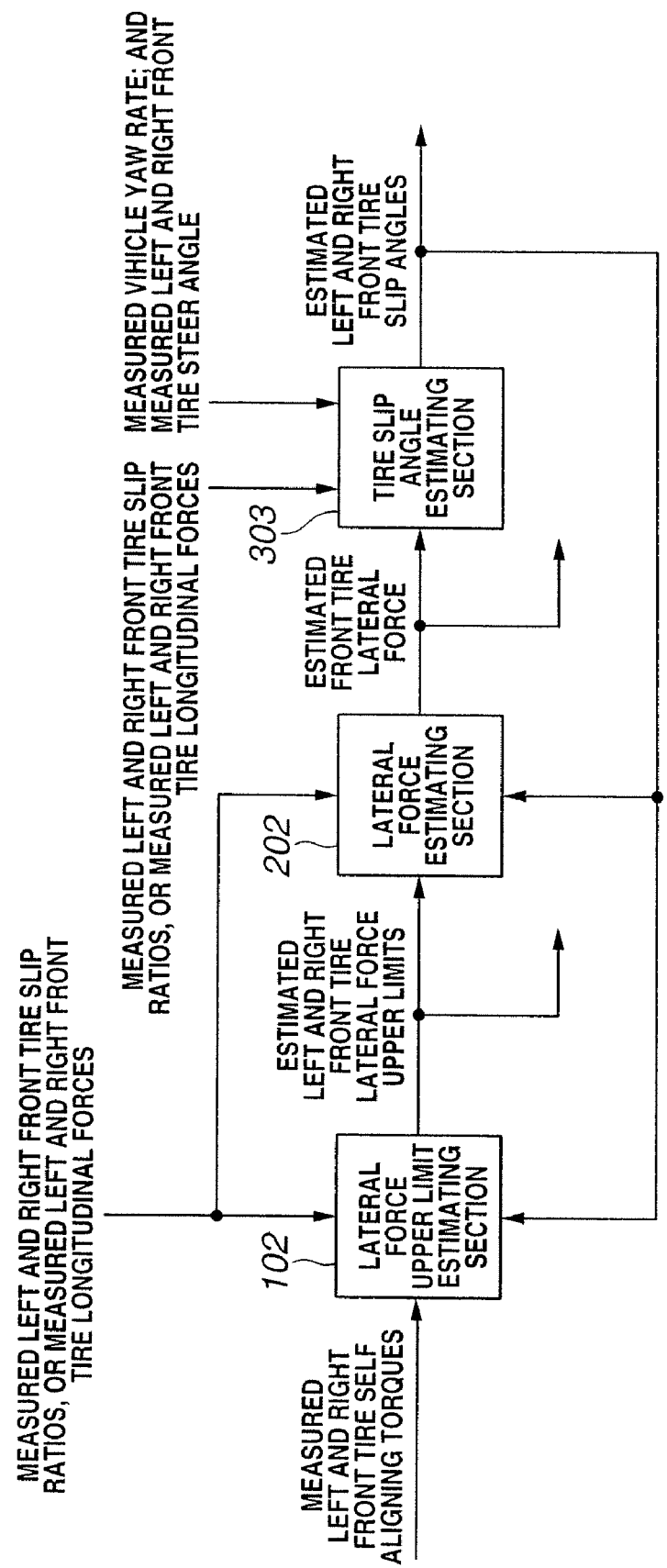
FIG. 11 is a block diagram showing a system for tire state estimation according to the fifth embodiment.

FIG. 11 shows a system for tire state estimation according to the fifth embodiment. In FIG. 11, tire slip angle estimating section 303 calculates estimated left and right front tire slip angles $\alpha_{flhat}$ and $\alpha_{frhat}$ on a basis of estimated front tire lateral force $F_{yfhat}$ as the sum of estimated left and right front tire lateral forces $F_{yflhat}$ and $F_{yfrhat}$ calculated by lateral force estimating section 202, a measured vehicle yaw rate, measured left and right front tire steer angles, and measured left and right front tire longitudinal forces, using an observer which is designed based on a model of vehicle dynamics as described in detail below. The observer is different from that in the first to fourth embodiments in that the observer state variables include vehicle slip angle and vehicle yaw rate instead of tire slip angle, and the observer compensates for an error in vehicle yaw rate instead of an error in tire lateral force.

The observer is designed based on equations (7) and (8) which govern vehicle dynamics, and is expressed by equation (37) in which vehicle slip angle $\beta$ and vehicle yaw rate $\gamma$ are state variables to be estimated.

$$\dot{\hat{x}} = A\hat{x} + Bu + K(\gamma - C\hat{x}) \tag{37}$$

$$\hat{x} = \begin{bmatrix} \hat{\beta} \\ \hat{\gamma} \end{bmatrix},$$

$$u = \begin{bmatrix} F_{yflhat} \\ F_{yrhat} \\ M \end{bmatrix},$$

$$A = \begin{bmatrix} 0 & -1 \\ 0 & 0 \end{bmatrix},$$

$$B = \begin{bmatrix} 1/mV & 1/mV & 0 \\ a/I_z & -b/I_z & 1/I_z \end{bmatrix},$$

$$K = \begin{bmatrix} k_1 \\ k_2 \end{bmatrix},$$

$$C = \begin{bmatrix} 0 & 1 \end{bmatrix}$$

In equation (37), $k_1$ and $k_2$ represent observer gains, and M represents a yawing moment caused by tire longitudinal forces. Yawing moment M is expressed by equation (38).

$$M = d_t\{(F_{xfr} + F_{xrr}) - (F_{xfl} + F_{xrl})\} \tag{38}$$

Estimated rear tire lateral force $F_{yrhat}$ may be calculated using equation (12) shown in the first embodiment with a vehicle lateral acceleration sensor added, or may be measured by an additional lateral force sensor.

Then, tire slip angle estimating section 303 calculates estimated left and right front tire slip angles $\alpha_{flhat}$ and $\alpha_{frhat}$ on a basis of the estimated vehicle slip angle $\beta$, estimated vehicle yaw rate $\gamma$, measured vehicle speed V, and measured left and right front tire steer angles $\delta_{fl}$ and $\delta_{fr}$, using equations (39) and (40).

$$\alpha_{flhat} = \hat{\beta} + \frac{a\hat{\gamma}}{V} - \delta_{fl} \quad (39)$$

$$\alpha_{frhat} = \hat{\beta} + \frac{a\hat{\gamma}}{V} - \delta_{fr} \quad (40)$$

The configuration and method described above are available for an automotive vehicle provided with steerable rear wheels. In such cases, tire slip angle estimating section 303 is modified to calculate estimated left and right rear tire slip angles $\alpha_{rlhat}$ and $\alpha_{rrhat}$, using equations (41) and (42).

$$\alpha_{rlhat} = \hat{\beta} - \frac{b\hat{\gamma}}{V} - \delta_{rl} \quad (41)$$

$$\alpha_{rrhat} = \hat{\beta} - \frac{b\hat{\gamma}}{V} - \delta_{rr} \quad (42)$$

In cases in which the vehicle is provided with four wheels which are actively and electronically steerable independently of each other, estimated front and rear tire lateral forces $F_{yfhat}$ and $F_{yrhat}$ may be individually calculated on a basis of tire slip angle and estimated lateral force upper limit by lateral force estimating section 202, without using equation (12) which defines a balance between front and rear tire lateral forces. This can be implemented with no vehicle lateral acceleration sensor or no additional lateral force sensor.

Driving motor 40 may be replaced with another type driving source such as an internal combustion engine.

Embodiment 6

The tire state estimator is exemplified in an automotive vehicle wherein:

(Front Wheel System)

A4) Steering system in which left and right wheels are mechanically separated from a steering wheel, mechanically separated from each other, and configured to be actively and electronically steered according to steering wheel angle independently of each other; and B2) Driving/braking system in which left and right wheels are subject to driving/braking torques, which may be a system in which a driving torque is distributed through a differential gear into the left and right wheels, or may be a system in which the left and right wheels are driven or braked independently of each other;

(Rear Wheel System)

A1) No steering system; and

B1) No driving/braking system; and (Tire Slip Angle Estimating Section)

C3) Observer, wherein:

measured vehicle state: tire steer angle, and tire lateral force, (and tire longitudinal force or tire slip ratio, if a driving/braking system is provided); and observer state variable(s): tire slip angle, and vehicle yaw rate.

The sixth embodiment differs from the fourth embodiment in that tire slip angle estimating section 304 employs an observer different from that of tire slip angle estimating section 302 of the fourth embodiment. Tire slip angle estimating section 304 is configured to receive input of a measured tire lateral force instead of a measured vehicle yaw rate.

Figure 12A:
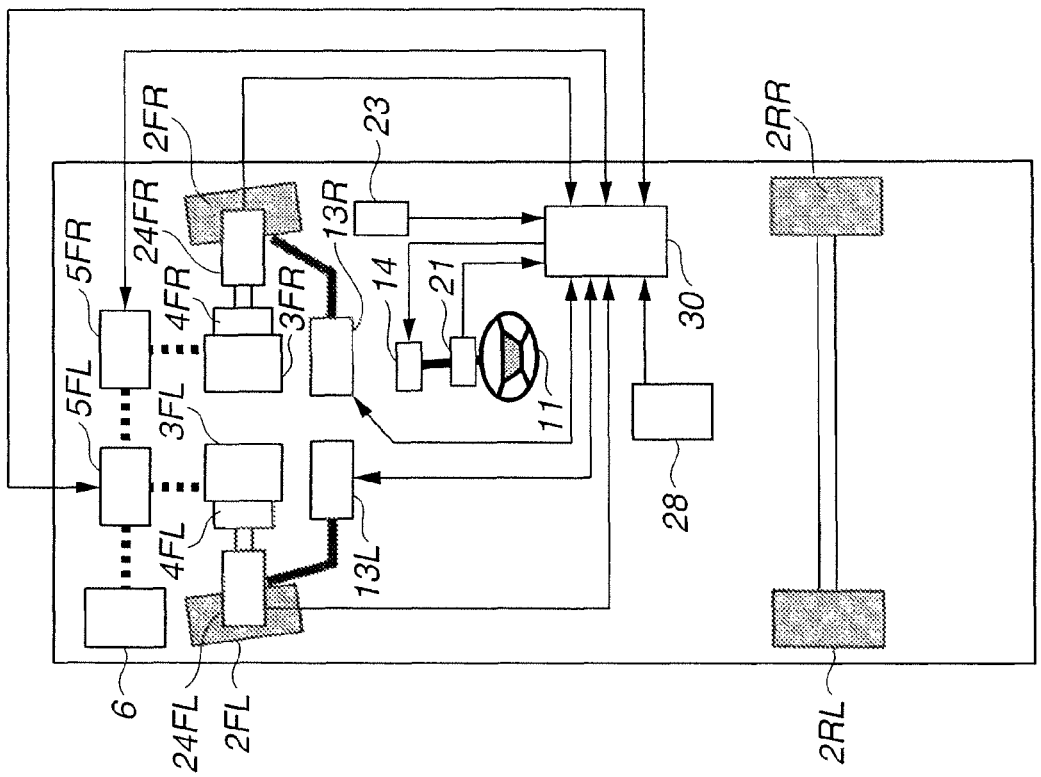
FIGS. 12A and 12B are schematic diagrams each showing configuration of an automotive vehicle provided with a tire state estimator according to the sixth embodiment.
Figure 12B:
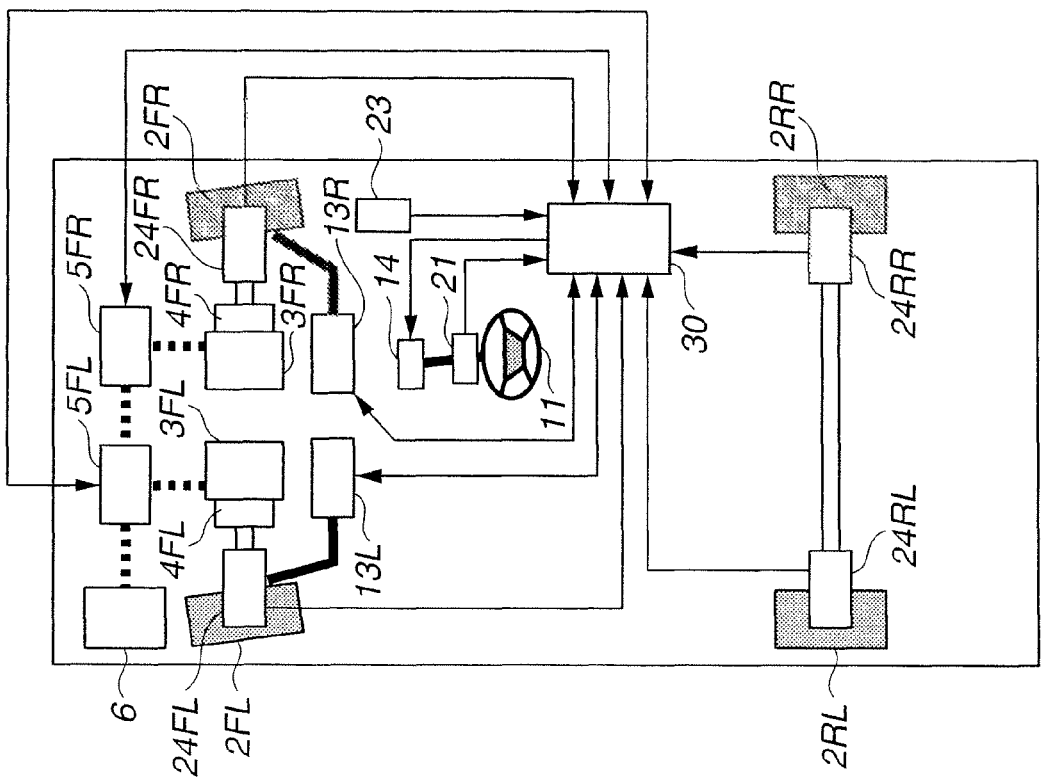

FIGS. 12A and 12B each show configuration of an automotive vehicle provided with the tire state estimator according to the sixth embodiment. The following describes differences as compared to the fourth embodiment.

In the case of FIG. 12A, the vehicle includes no yaw rate sensor 8, no acceleration sensor 28, but includes four lateral force sensors 24FL, 24FR, 24RL and 24RR attached to respective wheels, as compared to the fourth embodiment. For example, lateral force sensors 24FL, 24FR, 24RL and 24RR may be of a type that includes a strain gage attached to a tire hub, measures changes in electrical resistance, and converts same into measured lateral force. Alternatively, lateral force sensors 24FL, 24FR, 24RL and 24RR may be of a type that measures a strain of a tire rotating shaft due to lateral force on a basis of a detected phase difference between generated pulses at two different points. The configuration of FIG. 12B includes no lateral force sensors 24RL and 24RR, but includes acceleration sensor 28, as compared to that of FIG. 12A. As compared to the fifth embodiment, the vehicle includes no yaw rate sensor 8.

Integrated controller 30 is configured to receive input of signals indicative of accelerator opening APO measured by accelerator pedal sensor 23, steering wheel angle STR measured by steering wheel angle sensor 21, steering motor torque $\tau_{actl}$ and left front tire steer angle $\theta_{fl}$ measured by steering motor 13L, steering motor torque $\tau_{actr}$ and right front tire steer angle $\theta_{fr}$ measured by steering motor 13R, driving motor torque $T_{fl}$ and left front wheel speed $\omega_{FL}$ measured by electric motor 3FL, driving motor torque $T_{fr}$ and right front wheel speed $\omega_{FR}$ measured by electric motor 3FR, and wheel speeds $\omega_{RL}$ and $\omega_{RR}$ measured by the rotational speed sensors attached to the left and rear wheels.

In the case of FIG. 12A, integrated controller 30 is further configured to receive input of signals indicative of tire lateral forces $F_{yfl}$, $F_{yfr}$, $F_{yrl}$ and $F_{yrr}$ measured by lateral force sensors 24FL, 24FR, 24RL and 24RR. In the case of FIG. 12B, integrated controller 30 is further configured to receive input of signals indicative of tire lateral forces $F_{yfl}$ and $F_{yfr}$ measured by lateral force sensors 24FL and 24FR, and vehicle longitudinal acceleration $a_x$ and vehicle lateral acceleration $a_y$ measured by acceleration sensor 28.

Figure 13:
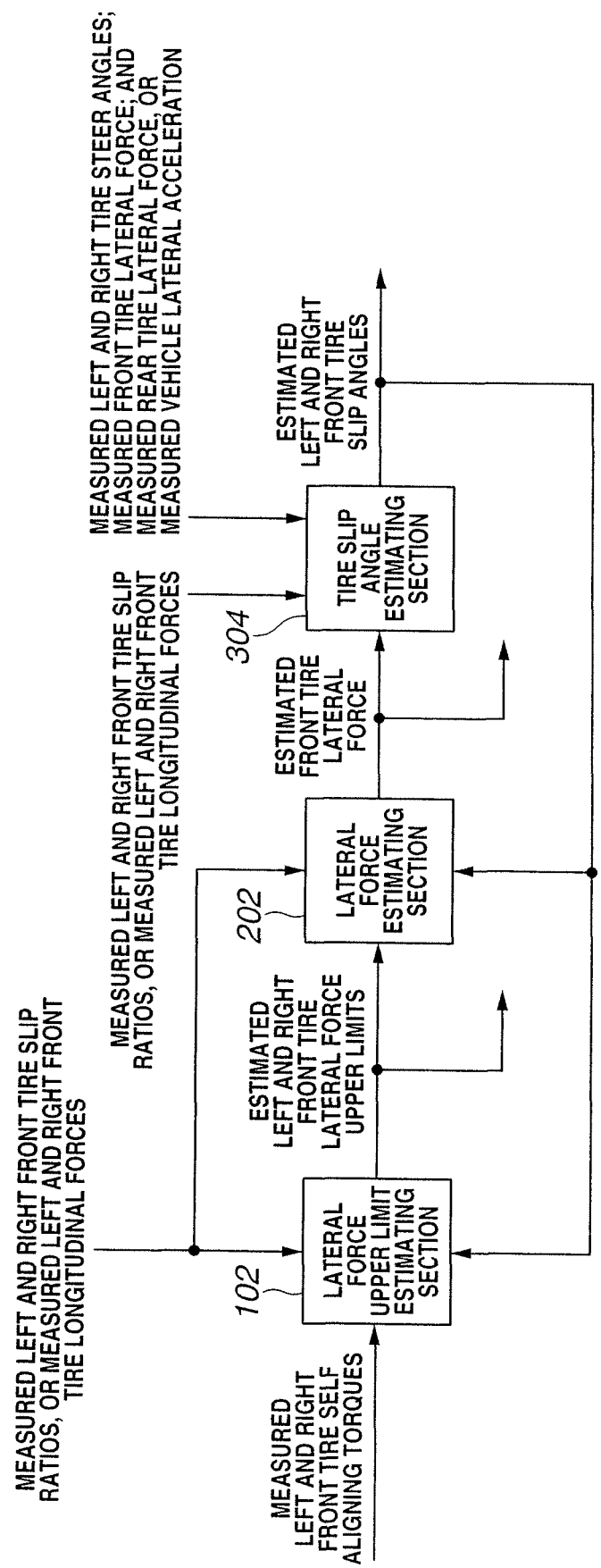
FIG. 13 is a block diagram showing a system for tire state estimation according to the sixth embodiment.

FIG. 13 shows a system for tire state estimation according to the sixth embodiment. In FIG. 13, lateral force upper limit estimating section 102 and lateral force estimating section 202 are the same as in the fifth embodiment.

In FIG. 13, tire slip angle estimating section 304 calculates estimated left and right front tire slip angles $\alpha_{flhat}$ and $\alpha_{frhat}$ on a basis of estimated front tire lateral force $F_{yfhat}$ calculated by lateral force estimating section 202, measured vehicle speed V, measured left and right front tire steer angles $\delta_{fl}$ and $\delta_{fr}$, and measured left and right front tire longitudinal forces, using an observer which is designed based on a model of vehicle dynamics as described in detail below.

The observer is designed based on equations (7) and (8) which govern vehicle dynamics, and is expressed by equation (43) in which vehicle slip angle $\beta$ and vehicle yaw rate $\gamma$ are state variables to be estimated.

$$\hat{\dot{x}} = A\hat{x} + Bu + K(F_{yf} - F_{yfhat}) \quad (43)$$

$$\hat{x} = \begin{bmatrix} \hat{\beta} \\ \hat{\gamma} \end{bmatrix},$$

$$u = \begin{bmatrix} F_{yfhat} \\ F_{yr} \\ M \end{bmatrix},$$

$$A = \begin{bmatrix} 0 & -1 \\ 0 & 0 \end{bmatrix},$$

$$B = \begin{bmatrix} 1/mV & 1/mV & 0 \\ a/I_z & -b/I_z & 1/I_z \end{bmatrix},$$

$$K = \begin{bmatrix} k_1 \\ k_2 \end{bmatrix}$$

In equation (43), $k_1$ and $k_2$ represent observer gains, and $F_{yf}$ represents the sum of measured left and right front tire lateral forces. In the case of FIG. 12A, $F_{yr}$ is calculated as the sum of measured left and right rear tire lateral forces. In the case of FIG. 12B, $F_{yr}$ is calculated using equation (44).

$$F_{yr} = ma_y - F_{yfl} - F_{yfr} \quad (44)$$

Then, tire slip angle estimating section 304 calculates estimated left and right front tire slip angles $\alpha_{flhat}$ and $\alpha_{frhat}$ on a basis of estimated vehicle slip angle $\beta$, estimated vehicle yaw rate $\gamma$, measured vehicle speed V, and measured left and right front tire steer angles $\delta_{fl}$ and $\delta_{fr}$, using equations (39) and (40).

The configuration and method described above are available for an automotive vehicle provided with steerable rear wheels. In such cases, tire slip angle estimating section 304 is modified to calculate estimated left and right rear tire slip angles $\alpha_{rlhat}$ and $\alpha_{rrhat}$, using equations (41) and (42).

In cases in which the vehicle is provided with four wheels which are actively and electronically steerable independently of each other, estimated front and rear tire lateral forces $F_{yfhat}$ and $F_{yrhat}$ may be individually calculated on a basis of tire slip angle and estimated lateral force upper limit by lateral force estimating section 202, without using equation (12) which defines a balance between front and rear tire lateral forces.

Driving motor 40 may be replaced with another type driving source such as an internal combustion engine.

Embodiment 7

Figure 14:
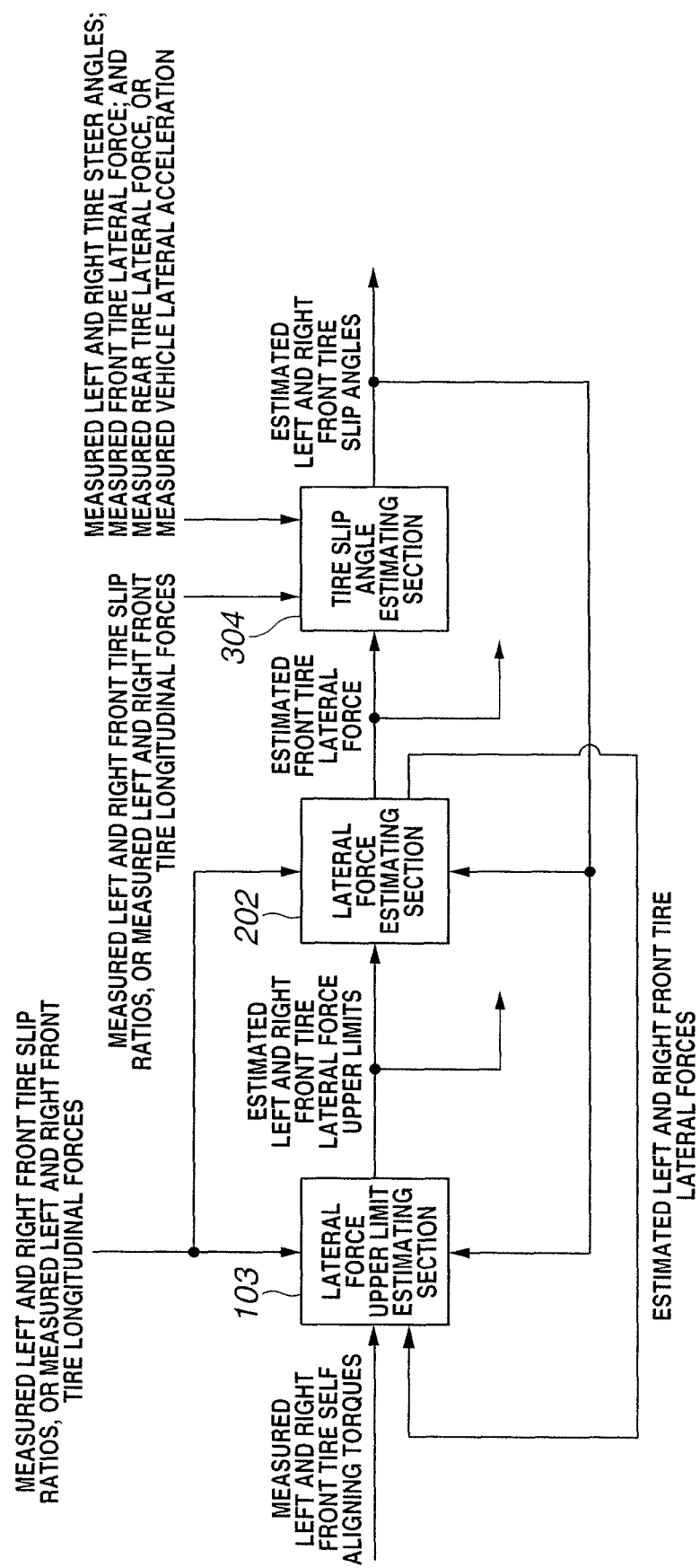
FIG. 14 is a block diagram showing a system for tire state estimation according to the seventh embodiment.

The construction of the vehicle according to the seventh embodiment is the same as that of the sixth embodiment shown in FIGS. 12A and 12B. FIG. 14 shows a system for tire state estimation according to the seventh embodiment, in which lateral force estimating section 202 and tire slip angle estimating section 304 are the same as in the sixth embodiment, but lateral force upper limit estimating section 103 is different from lateral force upper limit estimating section 102 of the sixth embodiment.

Left and right front tire slip ratios $\sigma_{fl}$ and $\sigma_{fr}$ or left and right front tire longitudinal forces $F_{xfl}$ and $F_{xfr}$, which are inputted into lateral force upper limit estimating section 103, are calculated in the same manner as in the fifth embodiment.

Figure 15:
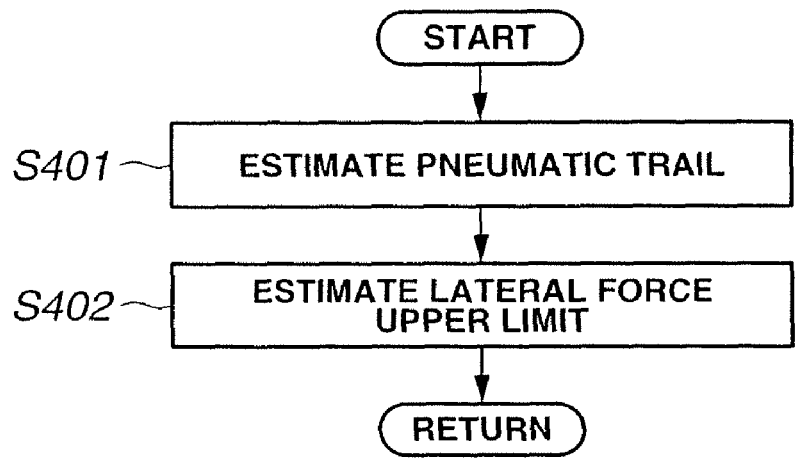
FIG. 15 is a flow chart showing a process of estimation of lateral force upper limit according to the seventh embodiment.

In FIG. 14, lateral force upper limit estimating section 103 calculates estimated left and right front tire lateral force upper limits $F_{yflmax}$ and $F_{yfrmax}$ on a basis of measured left and right front tire self aligning torques $\tau_{afl}$ and $\tau_{afr}$, measured left and right front tire slip ratios $\sigma_{fl}$ and $\sigma_{fr}$ or measured left and right front tire longitudinal forces $F_{xfl}$ and $F_{xfr}$, estimated left and right front tire lateral forces $F_{yflhat}$ and $F_{yfrhat}$ calculated by lateral force estimating section 202, and estimated left and right front tire slip angles $\alpha_{flhat}$ and $\alpha_{frhat}$ calculated by tire slip angle estimating section 304, according to a process shown in FIG. 15.

In FIG. 15, at Step S401, lateral force upper limit estimating section 103 calculates estimated left and right front tire pneumatic trails $t_{pflhat}$ and $t_{pfrhat}$ on a basis of measured left and right front tire self aligning torques $\tau_{afl}$ and $\tau_{afr}$, and estimated left and right front tire lateral forces $F_{yflhat}$ and $F_{yfrhat}$ calculated by lateral force estimating section 202, using equation (45) which defines a general relationship among tire lateral force $F_y$, self aligning torque $\tau_a$, and pneumatic trail $t_p$. Pneumatic trail is a distance between a tire center and a point of application of lateral force.

$$\tau_a = (t_p + t_m) F_y \quad (45)$$

In equation (45), $t_m$ represents a caster trail. On the basis of equation (45), estimated left and right front tire pneumatic trails $t_{pflhat}$ and $t_{pfrhat}$ are calculated using equations (46) and (47).

$$t_{pflhat} = \frac{\tau_{afl}}{F_{yflhat}} - t_m \quad (46)$$

$$t_{pfrhat} = \frac{\tau_{afr}}{F_{yfrhat}} - t_m \quad (47)$$

Estimated left and right front tire pneumatic trails $t_{pflhat}$ and $t_{pfrhat}$ may be further processed for noise elimination, for example, with a low-pass filter, and/or with a method of moving averages.

At Step S402, lateral force upper limit estimating section 103 calculates estimated left and right front tire lateral force upper limits $F_{yflmax}$ and $F_{yfrmax}$ on a basis of estimated left and right front tire pneumatic trails $t_{pflhat}$ and $t_{pfrhat}$, measured left and right front tire slip ratios $\sigma_{fl}$ and $\sigma_{fr}$ or measured left and right front tire longitudinal forces $F_{xfl}$ and $F_{xfr}$, and estimated left and right front tire slip angles $\alpha_{flhat}$ and $\alpha_{frhat}$.

For example, the Fiala tire model gives equation (48) which defines a general relationship among pneumatic trail $t_p$, tire slip angle $\alpha$, and lateral force upper limit $F_{ymax}$.

$$F_{ymax} = -\frac{c_1 |\tan\alpha|}{t_p + c_0} \quad (48)$$

In equation (48), $c_0$ and $c_1$ represent values that depend on tire properties and are assumed to be constant at least with respect to $t_p$, $\alpha$ and $F_{ymax}$.

When the front tire set is assumed to be subject to no longitudinal forces, lateral force upper limit estimating section 103 calculates estimated left and right front tire lateral force upper limits $F_{yflmax}$ and $F_{yfrmax}$ on a basis of estimated left and right front tire pneumatic trails $t_{pflhat}$ and $t_{pfrhat}$, and estimated left and right front tire slip angles $\alpha_{flhat}$ and $\alpha_{frhat}$, using equation (48).

In cases in which the brush tire model is employed for consideration of tire longitudinal forces, equations (27) and (28) which define the relationship between lateral force upper limit $F_{ymax}$ ($=\mu F_z$) and self aligning torque are divided by equations (29) and (30) which define the relationship between lateral force upper limit $F_{ymax}$ ($=\mu F_z$) and lateral force, so as to give a relationship between lateral force upper limit $F_{ymax}$ ($=\mu F_z$) and pneumatic trail $t_p$.

Figure 16:
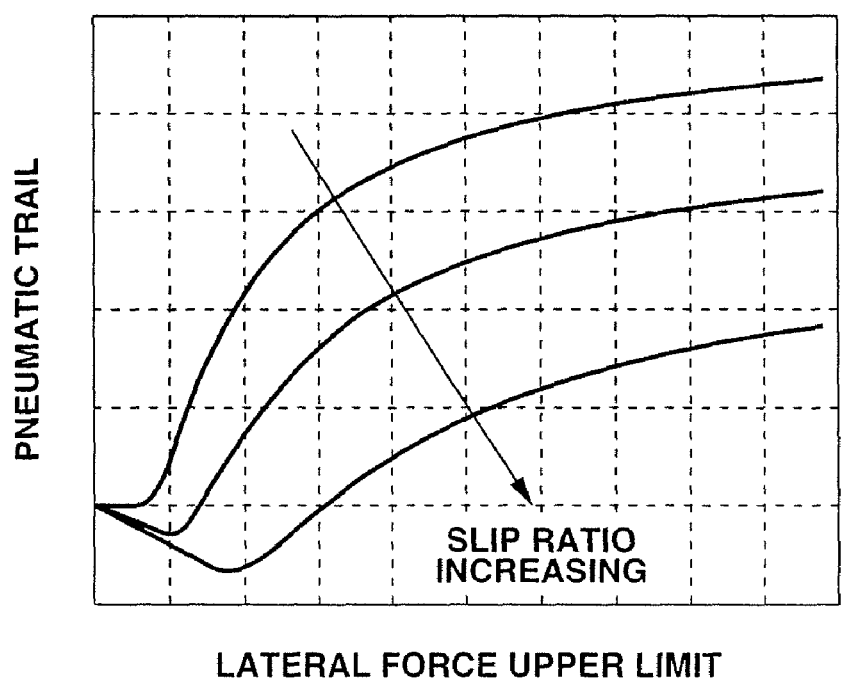
FIG. 16 is a graphic diagram showing a relationship between lateral force upper limit and pneumatic trail.

The given equation set is somewhat complicated and include bifurcation. Accordingly, the equation set is solved by an iterative calculation method such as the Newton method so as to find a value of $\mu F_z$ with which a value of the equation set conforms to measured pneumatic trail $t_p$. Since situations are possible in which two valid values of $\mu F_z$ exist with respect to a single pneumatic trail as shown in FIG. 16, a first iterative calculation process is started with $\mu F_z$ set to an initial value of 0, and a second iterative calculation process is started with $\mu F_z$ set to an initial value of an adequately large value. Then, one of the two found values of $\mu F_z$ is selected which is relatively close to a last calculated value of $\mu F_z$.

Calculation of estimated lateral force upper limit $F_{ymax}$ based on pneumatic trail is advantageous at least in the following points.

Figure 17:
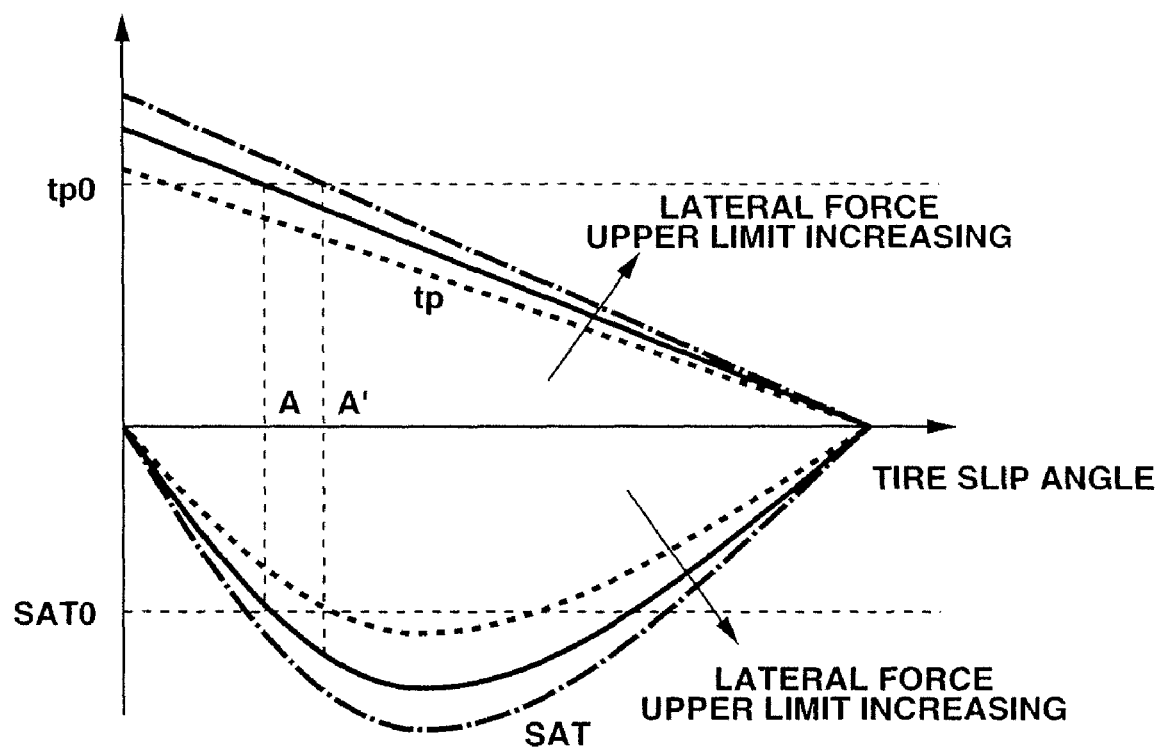
FIG. 17 is a graphic diagram showing a relationship between tire slip angle and self aligning torque, and a relationship between tire slip angle and pneumatic trail.

FIG. 17 shows a general relationship between tire slip angle and self aligning torque, and a general relationship between tire slip angle and pneumatic trail. The horizontal axis indicates tire slip angle, while the vertical axis indicates self aligning torque and pneumatic trail. In FIG. 17, solid lines indicate a first situation where a lateral force upper limit is equal to a first value, long dashed short dashed lines indicate a second situation where the lateral force upper limit is equal to a second value larger than the first value, dotted lines indicate a third situation the lateral force upper limit is equal to a third value smaller than the first value. As show in FIG. 17, self aligning torque changes nonlinearly with respect to tire slip angle. Specifically, as tire slip angle increases from zero, self aligning torque decreases from zero (increases in magnitude) in a first region of smaller tire slip angle, reaches a minimum value (maximum value in magnitude), and then increases (decreases in magnitude) in a second region of larger tire slip angle. Suppose a situation in which an actual tire slip angle is equal to A, and an estimated tire slip angle is equal to A' at a certain time instant, where A and A' are in the first region of smaller tire slip angle. In such a situation, when a value of self aligning torque, SAT0, is given, then an estimated lateral force upper limit is calculated as the third value smaller than an actual value, where the third value is found with reference to a point of intersection of a vertical line of a tire slip angle of A' and a horizontal line of a self aligning torque of SAT0 in FIG. 17, and the actual value is found equal to the first value with reference to a point of intersection of a vertical line of a tire slip angle of A and the horizontal line of the self aligning torque of SAT0 in FIG. 17. In other words, the value of lateral force upper limit at which tire slip angle A' conforms to self aligning torque SAT0 is smaller than the value of lateral force upper limit at which tire slip angle A conforms to self aligning torque SAT0. The estimated tire lateral force, which is calculated by lateral force estimating section 202 in FIG. 14, tends to decrease with decrease in the estimated tire lateral force upper limit set. Tire slip angle estimating section 304 corrects the estimated tire slip angle set on a basis of deviation between the measured tire lateral force and the estimated tire lateral force, where if the estimated tire lateral force is smaller than the measured tire lateral force, the estimated tire slip angle set is corrected to increase. Thus, the estimated tire slip angle, which has been already overestimated as A' with respect to A, may be further increased above A'. This process may cause estimated tire slip angle to diverge. In contrast, in the second region of larger tire slip angle, estimated tire slip angle tends to converge through the process of correction, without divergence, because the direction of change of self aligning torque with respect to tire slip angle is inverse as compared to the first region of smaller tire slip angle.

On the other hand, as shown in FIG. 17, pneumatic trail $t_p$ changes linearly with respect to tire slip angle. The rate of change of pneumatic trail $t_p$ with respect to tire slip angle is substantially constant. Suppose a situation where the actual tire slip angle is equal to A, and the estimated tire slip angle is equal to A' at a certain time instant, where A and A' are in the first region of smaller tire slip angle. In such a situation, when a value of pneumatic trail $t_{p0}$, is given, then the estimated lateral force upper limit is calculated as the second value larger than an actual value, where the second value is found with reference to a point of intersection of a vertical line of a tire slip angle of A' and a horizontal line of a pneumatic trail of $t_{p0}$ in FIG. 17, and the actual value is found equal to the first value with reference to a point of intersection of a vertical line of a tire slip angle of A and the horizontal line of the pneumatic trail of $t_{p0}$ in FIG. 17. In other words, the value of lateral force upper limit at which tire slip angle A' conforms to pneumatic trail $t_{p0}$ is larger than the value of lateral force upper limit at which tire slip angle A conforms to pneumatic trail $t_{p0}$. The estimated tire lateral force, which is calculated by lateral force estimating section 202 in FIG. 14, tends to increase with increase in the estimated tire lateral force upper limit set. Tire slip angle estimating section 304 corrects the estimated tire slip angle set on a basis of deviation between the measured tire lateral force and the estimated tire lateral force, where if the estimated tire lateral force is larger than the measured tire lateral force, the estimated tire slip angle set is corrected to decrease. Thus, the estimated tire slip angle, which has been overestimated as A' with respect to A, is reduced below A'. This process causes the estimated tire slip angle to converge, without divergence. Since pneumatic trail monotonously decreases with increase in tire slip angle as described above, the estimated tire slip angle tends to converge through the process of correction, over the entire range of tire slip angle.

In summary, calculation of estimated tire lateral force upper limit based on pneumatic trail is effective for assuring convergence of estimation of tire slip angle over the entire range of tire slip angle.

Embodiment 8

Figure 18:
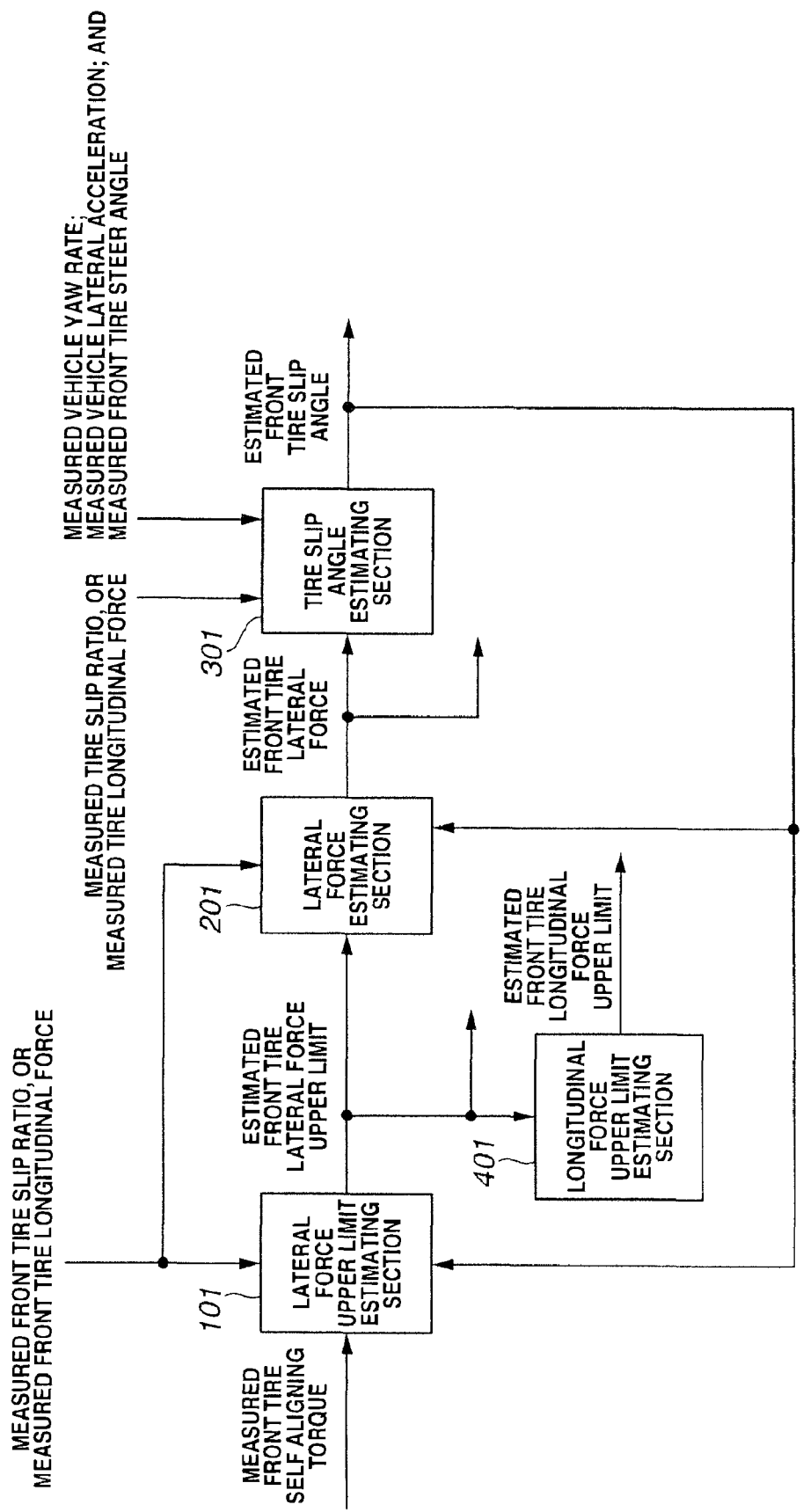
FIG. 18 is a block diagram showing a system for tire state estimation according to the eighth embodiment for an automotive vehicle provided with an active steering system.

The tire state estimator according to the eighth embodiment is configured to calculate an estimated tire longitudinal force upper limit, and limit driving/braking torques on a basis of the estimated tire longitudinal force upper limit. The construction of the vehicle according to the eighth embodiment is the same as that of the third embodiment shown in FIG. 6. FIG. 18 shows a system for tire state estimation according to the eighth embodiment, in which a longitudinal force upper limit estimating section 401 is added, as compared to the system of the third embodiment shown in FIG. 7.

Figure 19:
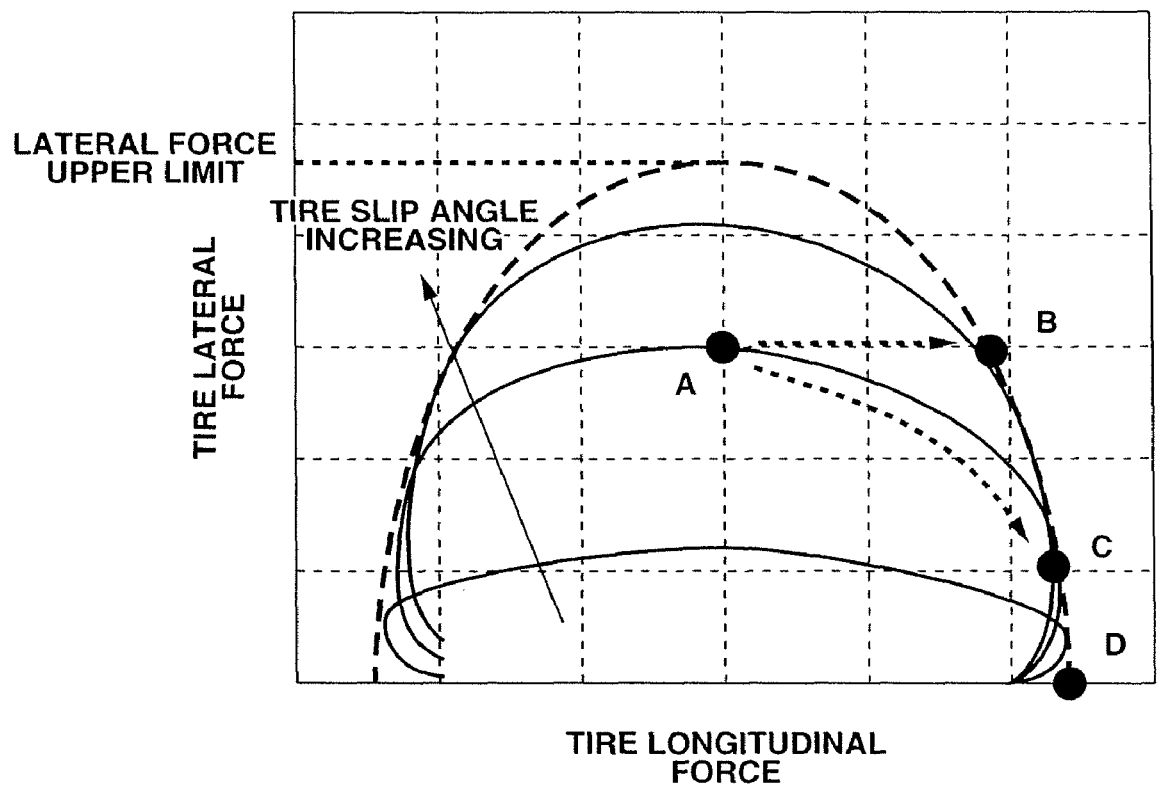
FIG. 19 is a graphic diagram showing a relationship between tire longitudinal force and tire lateral force.

In FIG. 19, three solid lines indicate relationships between tire longitudinal force and tire lateral force with tire slip angle given. These relationships are derived from equations (29) and (30) based on the brush tire model for tire lateral force, and equations (25) and (26) based on the brush tire model for tire longitudinal force.

In FIG. 19, an area encompassed by a broken line indicates a region of possible combinations of tire lateral force and tire longitudinal force dependent on tire slip angle and tire slip ratio, with a tire lateral force upper limit given. The broken line is so called tire friction circle. With lateral force upper limit $F_{ymax}$ ($=\mu F_z$) given, a longitudinal force upper limit is also equal to $\mu F_z$, which is calculated using equations (25) and (26). In many cases, the value of $\mu$ in the longitudinal direction of a tire is different from that in the lateral direction. In order to take the difference into account, the estimated tire lateral force upper limit may be corrected according to the difference in μ, before the tire lateral force upper limit is substituted into equations (25) and (26). In this case, tire estimated tire longitudinal force upper limit calculated using equations (25) and (26) is different from the estimated tire lateral force upper limit due to the correction of μ. Longitudinal force upper limit estimating section 401 is configured to output the thus-calculated estimated tire longitudinal force upper limit. The estimated tire longitudinal force upper limit may be used to limit the tire driving/braking torque, preventing the dynamic behavior of the vehicle from falling unstable due to tire slip.

An operating point, in which the tire slip angle and the driving/braking torque are controlled so as to achieve the tire longitudinal force upper limit, is indicated by point D in FIG. 19. When in the point D, the tire lateral force is equal to zero. When the vehicle can be actively controlled, any desired operating point within the tire friction circle can be achieved independently of driver's manipulation. Accordingly, longitudinal force upper limit estimating section 401 may be configured to calculate the estimated longitudinal force upper limit as an estimated upper limit of longitudinal force under a condition that a desired tire lateral force is maintained. For example, when the operating point of the vehicle is point A in FIG. 19, the upper limit of longitudinal force is equal to the value of the operating point B under the condition that the lateral force of point A is maintained. Calculation of point B may be based on a friction circle as an ellipse having a minor axis of the smaller one of lateral force upper limit and longitudinal force upper limit, and a major axis of the larger one. Otherwise, point B may be calculated using a map dependent on lateral force upper limit. On the basis of calculation of point B, when a request for tire longitudinal force above point B occurs in response to accelerator pedal manipulation during travel at point A, the point B can be achieved by regulating tire longitudinal force and tire slip angle. This allows the vehicle to turn, with the lateral acceleration maintained, without falling in a state of tire slip. The limitation based on point B can be implemented by limiting the desired driving/braking torque on a basis of the conditioned longitudinal force upper limit during the driving force control of Step S100, and performing a steering control with feedback of the estimated tire slip angle so as to hold constant the tire lateral force.

The value for limiting the driving/braking torque may be different from the absolute longitudinal force upper limit and the conditioned longitudinal force upper limit, and may be any value if the value is below the absolute longitudinal force upper limit.

The correction based on the difference in μ between the longitudinal and lateral directions serves to obtain an accurate longitudinal force upper limit, allow the potential of the tire to be fully used, and allow the vehicle to fully use the potential of braking performance during rapid braking to avoid emergency.

On the other hand, in cases in which steered wheels are mechanically linked to a steering wheel as in the first embodiment, tire slip angle depends on manipulation of a steering wheel, and thereby cannot be regulated independently of manipulation of the steering wheel. In such cases, the conditioned tire longitudinal force upper limit is equal to the value of point C in FIG. 19 to which the operating point moves from point A with the tire slip angle held constant. In order to take the current tire slip angle into account, the tire state estimator employs a system shown in FIG. 20 which is modified from FIG. 18 so that longitudinal force upper limit estimating section 401 receives input of the estimated tire slip angle. The conditioned tire longitudinal force upper limit may be found by using equations (25) and (26), substituting the estimated tire slip angle and the estimated lateral force upper limit ($\mu F_z$), changing tire slip ratio σ, and finding the maximum value of $F_x$. On the basis of the conditioned tire longitudinal force upper limit, the tire state estimator can prevent the tire from falling in a state of slip, and allow the vehicle to travel stably, although the tire lateral force upper limit may change due to change of the tire longitudinal force. Limitation of tire longitudinal force may be implemented by limiting the desired driving force to the conditioned tire longitudinal upper limit by the driving force control of Step S100.

Figure 20:
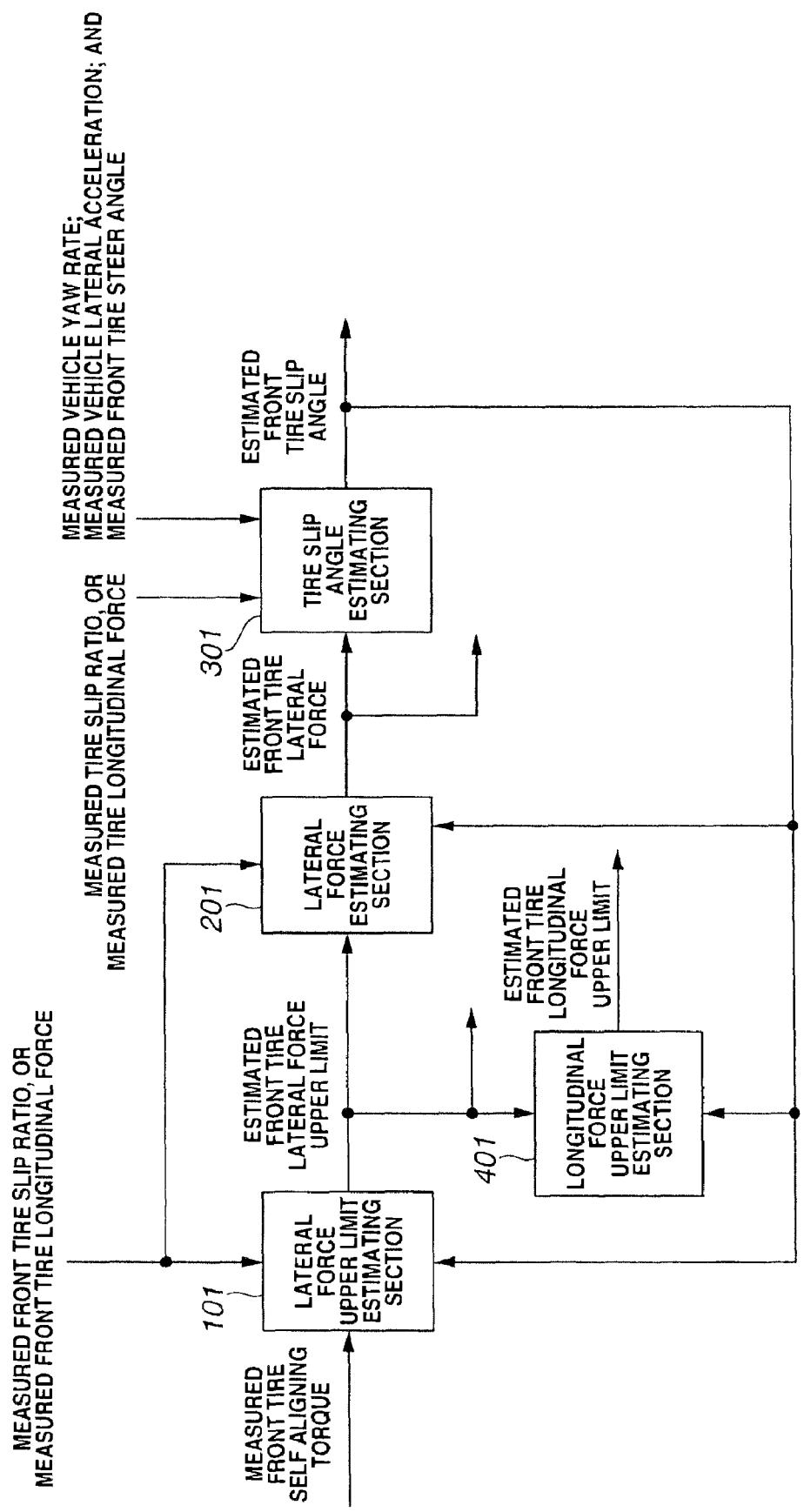
FIG. 20 is a block diagram showing a system for tire state estimation according to the eighth embodiment for an automotive vehicle provided with no active steering system.

In the case of FIG. 18, longitudinal force upper limit estimating section 401 functions as a longitudinal force upper limit estimator for: finding an estimated tire friction circle on a basis of the estimated tire lateral force upper limit calculated by the lateral force upper limit estimator, in a case of a vehicle provided with an actuator for steering a tire; and calculating, on a basis of the estimated tire friction circle, an estimated tire longitudinal force upper limit under a condition of a desired tire lateral force. In the case of FIG. 20, longitudinal force upper limit estimating section 401 functions as a longitudinal force upper limit estimator for: finding, on a basis of the estimated tire lateral force upper limit calculated by the lateral force upper limit estimator and the estimated tire slip angle calculated by the tire slip angle estimator, an estimated relationship between a tire longitudinal force and a tire lateral force under a condition of the estimated tire slip angle; and calculating, on a basis of the estimated relationship, an estimated tire longitudinal force upper limit under the condition of the estimated tire slip angle. Integrated controller 30 functions as a limiter for limiting at least one of driving and braking torques applied to a subject tire set, on a basis of the estimated tire longitudinal force upper limit calculated by the longitudinal force upper limit estimator.

Although the eighth embodiment is specifically configured by modifying the third embodiment, the first to seventh embodiments may be modified so that the longitudinal force upper limit estimating section is added in order to calculate the estimated longitudinal force upper limit in consideration of capability or incapability of active steering, and limit the driving/braking torque on a basis of the estimated longitudinal force upper limit.

Integrated controller 30 may function as a limiter for limiting a tire steer angle or steering wheel angle or tire slip angle, on a basis of the estimated tire lateral force upper limit calculated by the lateral force upper limit estimator.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A tire state estimator comprising:
  a sensor configured to collect information needed to measure a vehicle state interrelated dynamically to tire lateral force, and needed to measure a tire self aligning torque; and
  a controller connected for signal communication therewith to the sensor, the controller including:
    a tire slip angle estimator configured to calculate an estimated tire slip angle, on a basis of an estimated tire lateral force upper limit and the measured vehicle state; and a lateral force upper limit estimator configured to calculate the estimated tire lateral force upper limit, on a basis of the estimated tire slip angle calculated by the tire slip angle estimator and the measured tire self aligning torque.

2. The tire state estimator as claimed in claim 1, wherein the lateral force upper limit estimator is configured to implement the calculation of the estimated tire lateral force upper limit on a basis of a brush tire model.

3. The tire state estimator as claimed in claim 1, wherein the lateral force upper limit estimator is configured to implement the calculation of the estimated tire lateral force upper limit on a basis of an equation set of:

if $\sigma > 0$, $$\tau_a = \begin{cases} \frac{lK_\alpha \tan\alpha}{2(1-\sigma)}\xi_{sb}^2\left(1-\frac{4}{3}\xi_{sb}\right) - & \text{if } \xi_{sb} = 1 - \frac{K_s}{2\mu F_z}\frac{\lambda}{1-\sigma} \geq 0 \\ \frac{3}{2}l\mu F_z \sin\theta \xi_{sb}^2(1-\xi_{sb})^2 + \\ \frac{2lK_s\sigma\tan\alpha}{3(1-\sigma)^2}\xi_{sb}^3 + \\ \frac{3l(\mu F_z)^2 \sin\theta\cos\theta}{5K_\alpha}(1-10\xi_{sb}^3 + 15\xi_{sb}^4 - 6\xi_{sb}^5) \\ \frac{3l(\mu F_z)^2 \sin\theta\cos\theta}{5K_\alpha} & \text{if } \xi_{sb} = 1 - \frac{K_s}{3\mu F_z}\frac{\lambda}{1-\sigma} < 0 \end{cases}$$

if $\sigma < 0$, $$\tau_a = \begin{cases} \frac{l}{2}K_\alpha(1+\sigma)\tan\alpha\xi_{sd}^2\left(1-\frac{4}{3}\xi_{sd}\right) - & \text{if } \xi_{sd} = 1 - \frac{K_s}{3\mu F_z}\lambda \geq 0 \\ \frac{3}{2}l\mu F_z \sin\theta\xi_{sd}^2(1-\xi_{sd})^2 + \\ \frac{2}{3}lK_s(1+\sigma)\sigma\tan\alpha\xi_{sd}^3 + \\ \frac{3l(\mu F_z)^2 \sin\theta\cos\theta}{5K_\alpha}(1-10\xi_{sd}^3 + 15\xi_{sd}^4 - 6\xi_{sd}^5) \\ \frac{3l(\mu F_z)^2 \sin\theta\cos\theta}{5K_\alpha} & \text{if } \xi_{sd} = 1 - \frac{K_s}{3\mu F_z}\lambda < 0 \end{cases}$$

wherein:
$\tau_a$ represents a tire self aligning torque;
$\alpha$ represents a tire slip angle;
$\mu$ represents a tire-road friction coefficient;
$F_z$ represents a tire vertical load;
$\sigma$ represents a tire slip ratio;
$K_\alpha$, $K_s$ and $l$ represent values that are assumed to be constant at least with respect to $\tau_a$, $\alpha$, $\sigma$ and $\mu F_z$;
$\theta$ and $\lambda$ represent functions of $\alpha$ and $\sigma$; and
wherein the estimated tire lateral force upper limit is calculated by substituting the measured tire self aligning torque into $\tau_a$, substituting the estimated tire slip angle into $\alpha$, substituting a measured tire slip ratio into $\sigma$, and finding a value of $\mu F_z$ which satisfies the equation set.

4. The tire state estimator as claimed in claim 1, wherein the lateral force upper limit estimator is configured to implement the calculation of the estimated tire lateral force upper limit on a basis of a Fiala tire model.

5. The tire state estimator as claimed in claim 1, wherein the lateral force upper limit estimator is configured to implement the calculation of the estimated tire lateral force upper limit on a basis of an equation of:

$$\tau_a = -\left(c_0 + \frac{c_1|\tan\alpha|}{\mu F_z}\right)\left(c_2\tan\alpha + \frac{c_3\tan\alpha|\tan\alpha|}{\mu F_z} + \frac{c_4\tan^3\alpha}{\mu^2 F_z^2}\right)$$

wherein:
$\tau_a$ represents a tire self aligning torque;
$\alpha$ represents a tire slip angle;
$\mu$ represents a tire-road friction coefficient;
$F_z$ represents a tire vertical load;
$c_0$, $c_1$, $c_2$, $c_3$ and $c_4$ represent values that are assumed to be constant at least with respect to $\tau_a$, $\alpha$ and $\mu F_z$; and
wherein the estimated tire lateral force upper limit is calculated by substituting the measured tire self aligning torque into $\tau_a$, substituting the estimated tire slip angle into $\alpha$, and finding a value of $\mu F_z$ which satisfies the equation.

6. The tire state estimator as claimed in claim 1, wherein the measured vehicle state includes a measured vehicle yaw rate.

7. The tire state estimator as claimed in claim 1, wherein the measured vehicle state includes a measured vehicle yaw rate and a measured vehicle lateral acceleration.

8. The tire state estimator as claimed in claim 1, wherein the tire slip angle estimator includes a lateral force estimating section configured to calculate an estimated tire lateral force, on a basis of the estimated tire lateral force upper limit calculated by the lateral force upper limit estimator and the estimated tire slip angle calculated by the tire slip angle estimator.

9. The tire state estimator as claimed in claim 8, wherein the tire slip angle estimator further includes a tire slip angle estimating section configured to calculate the estimated tire slip angle, on a basis of the estimated tire lateral force calculated by the lateral force estimating section and the measured vehicle state.

10. The tire state estimator as claimed in claim 9, wherein the tire slip angle estimating section is configured to:
   calculate a measured tire lateral force on a basis of the measured vehicle state; and
   calculate the estimated tire slip angle, on a basis of a difference between the estimated tire lateral force calculated by the lateral force estimating section and the measured tire lateral force.

11. The tire state estimator as claimed in claim 8, wherein the lateral force upper limit estimator is configured to:
   calculate an estimated tire pneumatic trail, on a basis of the estimated tire lateral force calculated by the lateral force estimating section and the measured tire self aligning torque; and
   calculate the estimated tire lateral force upper limit, on a basis of the estimated tire slip angle calculated by the tire slip angle estimator and the estimated tire pneumatic trail.

12. The tire state estimator as claimed in claim 1, further comprising a longitudinal force upper limit estimator configured to:
   find, on a basis of the estimated tire lateral force upper limit calculated by the lateral force upper limit estimator and the estimated tire slip angle calculated by the tire slip angle estimator, an estimated relationship between a tire longitudinal force and a tire lateral force under a condition of the estimated tire slip angle; and
   calculate, on a basis of the estimated relationship, an estimated tire longitudinal force upper limit under the condition of the estimated tire slip angle.

13. The tire state estimator as claimed in claim 12, further comprising a limiter configured to limit at least one of driving and braking torques applied to a subject tire set, on a basis of the estimated tire longitudinal force upper limit calculated by the longitudinal force upper limit estimator.

14. The tire state estimator as claimed in claim 1, further comprising a longitudinal force upper limit estimator configured to:
   find an estimated tire friction circle on a basis of the estimated tire lateral force upper limit calculated by the lateral force upper limit estimator, in a case of a vehicle provided with an actuator for steering a tire; and
   calculate, on a basis of the estimated tire friction circle, an estimated tire longitudinal force upper limit under a condition of a desired tire lateral force.

15. The tire state estimator as claimed in claim 14, further comprising a limiter configured to limit at least one of driving and braking torques applied to a subject tire set, on a basis of the estimated tire longitudinal force upper limit calculated by the longitudinal force upper limit estimator.

16. The tire state estimator as claimed in claim 1, wherein the lateral force upper limit estimator is configured to calculate the estimated tire lateral force upper limit, on a basis of the estimated tire slip angle calculated by the tire slip angle estimator, the measured tire self aligning torque, and at least one of a measured tire longitudinal force and a measured tire slip ratio.

17. The tire state estimator as claimed in claim 1, wherein the tire slip angle estimator is configured to calculate the estimated tire slip angle, on a basis of the estimated tire lateral force upper limit calculated by the lateral force upper limit estimator, the measured vehicle state, and at least one of a measured tire longitudinal force and a measured tire slip ratio.

18. The tire state estimator as claimed in claim 1, further comprising a limiter configured to limit a tire steer angle on a basis of the estimated tire lateral force upper limit calculated by the lateral force upper limit estimator.

19. A tire state estimator comprising:
   sensing means for collecting information needed to measure a vehicle state interrelated dynamically to tire lateral force, and needed to measure a tire self aligning torque;
   tire slip angle estimating means for calculating an estimated tire slip angle, on a basis of an estimated tire lateral force upper limit and the measured vehicle state; and
   lateral force upper limit estimating means for calculating the estimated tire lateral force upper limit, on a basis of the estimated tire slip angle calculated by the tire slip angle estimating means and the measured tire self aligning torque.

20. A tire state estimation method comprising:
   a first operation of collecting information needed to measure a vehicle state interrelated dynamically to tire lateral force, and needed to measure a tire self aligning torque;
   a second operation of calculating an estimated tire slip angle, on a basis of an estimated tire lateral force upper limit and the measured vehicle state; and
   a third operation of calculating the estimated tire lateral force upper limit, on a basis of the estimated tire slip angle calculated by the second operation and the measured tire self aligning torque.

* * * * *